United States Patent
Saito et al.

(10) Patent No.: US 7,821,905 B2
(45) Date of Patent: Oct. 26, 2010

(54) OPTICAL PICKUP DEVICE AND OPTICAL DISK DEVICE

(75) Inventors: Masahiro Saito, Kanagawa (JP); Kiyoshi Toyota, Tokyo (JP); Motoo Aiba, Tokyo (JP)

(73) Assignee: Sony Corporation, Tokyo (JP)

(*) Notice: Subject to any disclaimer, the term of this patent is extended or adjusted under 35 U.S.C. 154(b) by 433 days.

(21) Appl. No.: 12/032,090

(22) Filed: Feb. 15, 2008

(65) Prior Publication Data
US 2008/0198465 A1 Aug. 21, 2008

(30) Foreign Application Priority Data
Feb. 16, 2007 (JP) ............... 2007-037052
Nov. 6, 2007 (JP) ............... 2007-289056

(51) Int. Cl.
*G11B 7/00* (2006.01)
(52) U.S. Cl. .............. 369/112.23; 369/112.01
(58) Field of Classification Search ........... 369/112.01, 369/112.23
See application file for complete search history.

(56) References Cited

U.S. PATENT DOCUMENTS

2003/0026190 A1* 2/2003 Hendriks et al. ....... 369/112.28

FOREIGN PATENT DOCUMENTS

JP 2006-309903 11/2006

* cited by examiner

*Primary Examiner*—Wayne R Young
*Assistant Examiner*—Adam R Giesy
(74) *Attorney, Agent, or Firm*—Oblon, Spivak, McClelland, Maier & Neustadt, L.L.P.

(57) ABSTRACT

An optical pickup device is disclosed. The device includes: a light source that emits a light beam of a predetermined wavelength of about 405 nm; an objective lens being a plastic lens provided with, on at least one surface, diffraction means of a zone diffractive structure suppressing generation of aberration to be caused by a temperature change, and has a numerical aperture of 0.82 or larger for gathering the light beam emitted from the light source with respect to an optical disk; and a collimator lens disposed between the light source and the objective lens, and derives a substantially-collimated light by converting an angle of divergence of the light beam emitted from the light source.

9 Claims, 17 Drawing Sheets (COMPARATIVE EXAMPLE)

(EXAMPLE 1)

(EXAMPLE 2)

(EXAMPLE 3)

(EXAMPLE 4)

(EXAMPLE 5)

(EXAMPLE 6)

DIFFRACTION ORDER = 5

SHORTEST PITCH = 15.3μm (EXAMPLE 7)

OPTICAL PICKUP DEVICE AND OPTICAL DISK DEVICE

CROSS REFERENCES TO RELATED APPLICATIONS

The present invention contains subject matter related to Japanese Patent Applications JP 2007-037052 and JP 2007-289056 filed in the Japanese Patent Office on Feb. 16, 2007 and Nov. 6, 2007, respectively, the entire contents of which being incorporated herein by reference.

BACKGROUND OF THE INVENTION

1. Field of the Invention

The present invention relates to an optical pickup device and an optical disk device that perform recording and/or reproduction of information with respect to an optical recording medium such as optical disk.

2. Description of the Related Art

A recording medium that has been popular for use to record information signals includes a CD (Compact Disc) using light beams of a wavelength of about 785 nm, a DVD (Digital Versatile Disc) using light beams of a wavelength of about 660 nm, and a high-density-recording-capable optical disk performing recording and reproduction of signals using light beams of a wavelength of about 405 nm coming from a bluish-violet semiconductor laser or others (hereinafter, referred to as "high-density-recording optical disk). For recording and reproduction of information signals to/from such an optical disk, an optical pickup device has been used.

Such an optical pickup device generally uses a single objective lens, which has the design wavelength of suppressing any axial spherical aberration. A semiconductor laser used as a light source in any actual optical pickup device suffers from a variation of an oscillation wavelength caused during manufacturing, but with a CD, a DVD, and others, as long as with the design wavelength of suppressing any spherical aberration on an optical axis, the amount of spherical aberration has been permissible even if the spherical aberration is generated due to the oscillation wavelength showing a difference from the design wavelength.

The issue here is that, in an optical system of an optical pickup device for use with a so-called high-density-recording optical disk with a numerical aperture of 0.82 or larger, and the wavelength in use is of about 400 nm, i.e., short wavelength, even with a design wavelength of suppressing any axial spherical aberration, there is a problem that any variation of an oscillation wavelength caused due to manufacturing deviations or others in a semiconductor laser generates spherical aberration of an amount not permissive.

There is another problem that, when the optical system includes any component of diffractive structure, the spherical aberration to be caused due to the varying wavelength is increased in amount.

In view thereof, there needs to put the tolerance value under the strict observation in terms of the manufacturing deviations for a semiconductor laser to be used with the optical pickup device described above. This resultantly reduces the yield of the semiconductor laser, thereby preventing the reduction of the cost.

For more information, refer to Patent Document 1 (JP-A-2006-309903).

SUMMARY OF THE INVENTION

It is thus desirable to provide, for use in a device of performing recording and/or reproduction of information with respect to a high-density-recording optical disk, an optical pickup device and an optical disk device that can extend the tolerance range of a variation of an oscillation wavelength in a light source, and sufficiently reduce any aberration.

According to a first embodiment of the present invention, there is provided an optical pickup device, including: a light source that emits a light beam of a predetermined wavelength of about 405 nm; an objective lens being aplastic lens provided with, on at least one surface, diffraction means of a zone diffractive structure suppressing generation of aberration to be caused by a temperature change, and has a numerical aperture of 0.82 or larger for gathering the light beam emitted from the light source with respect to an optical disk; and a collimator lens disposed between the light source and the objective lens, and derives a substantially-collimated light by converting an angle of divergence of the light beam emitted from the light source. In the optical pickup device, the objective lens is formed to satisfy equation (1), where $\Delta SA3T$ is an amount of change of third-order spherical aberration to be generated in the objective lens in response to a temperature change $\Delta T$ (° C.) in a range from $-10°$ C. to 75° C., and $\Delta SA3\lambda$ is an amount of change of third-order spherical aberration to be generated in the objective lens in response to a wavelength change $\Delta\lambda$ (nm) within a range of ±5 nm observed in the light beam emitted from the light source, equation (3) is satisfied when a length of an optical path increased by the diffractive structure of the diffraction means is represented by an optical-path difference function $\phi(h)$ calculated by equation (2), where h (mm) is a height from an optical axis, Cn is an nth-order coefficient of an optical-path difference, and $\lambda$ (nm) is a wavelength of an incoming light beam, equation (4) is satisfied, where $\Delta SA3$ is an amount of change of third-order axial spherical aberration to be generated in the objective lens in response to the wavelength change $\Delta\lambda$ (nm), and $\Delta SA5$ is an amount of change of fifth-order axial spherical aberration, and with the objective lens, the generation of the spherical aberration to be caused by the temperature change can be suppressed, and when the light beam emitted from the light source is changed in wavelength, the generation of the spherical aberration can be suppressed by moving the collimator lens.

$$(\Delta SA3T/\Delta T) \times (\Delta SA3\lambda/\Delta\lambda) < 0 \tag{1}$$

$$\phi(h)=(C2\times h^2+C4\times h^4+C6\times h^6+C8\times h^8+C10\times h^{10}+\ldots)\times\lambda/10^6 \text{ (mm)} \tag{2}$$

$$C2\times C10>0 \tag{3}$$

$$\Delta SA3 \times \Delta SA5 > 0 \tag{4}$$

In the optical pickup device of the first embodiment above, the objective lens may be formed to satisfy equation (5) when a focal length thereof is f (mm).

$$-1.1\times10^2 < C2/f < 1.3\times10^1 \tag{5}$$

Also in the optical pickup device of the first embodiment, the objective lens may be formed to satisfy equation (6) when a focal length thereof is f (mm).

$$f \times C2 \times \lambda > -85000 \tag{6}$$

According to a second embodiment of the present invention, there is provided an optical disk device, including, an optical pickup device provided with: a light source that emits a light beam of a predetermined wavelength of about 405 nm; an objective lens being aplastic lens provided with, on at least one surface, diffraction means of a zone diffractive structure suppressing generation of aberration to be caused by a temperature change, and has a numerical aperture of 0.82 or larger for gathering the light beam emitted from the light source with respect to an optical disk; and a collimator lens disposed between the light source and the objective lens, and derives a substantially-collimated light by converting an angle of divergence of the light beam emitted from the light source, and performing recording and/or reproduction of an information signal with respect to the optical disk by the optical pickup device. In the optical disk device, the objective lens is formed to satisfy equation (7), where $\Delta SA3T$ is an amount of change of third-order spherical aberration to be generated in the objective lens in response to a temperature change $\Delta T$ (° C.) in a range from $-10°$ C. to $75°$ C., and $\Delta SA3\lambda$ is an amount of change of third-order spherical aberration to be generated in the objective lens in response to a wavelength change $\Delta\lambda$ (nm) within a range of $\pm 5$ nm observed in the light beam emitted from the light source, equation (9) is satisfied when a length of an optical path increased by the diffractive structure of the diffraction means is represented by an optical-path difference function $\phi(h)$ calculated by equation (8), where h (mm) is a height from an optical axis, Cn is an nth-order coefficient of an optical-path difference, and $\lambda$ (nm) is a wavelength of an incoming light beam, equation (10) is satisfied, where $\Delta SA3$ is an amount of change of third-order axial spherical aberration to be generated in the objective lens in response to the wavelength change $\Delta\lambda$ (nm), and $\Delta SA5$ is an amount of change of fifth-order axial spherical aberration, and with the objective lens, the generation of the spherical aberration to be caused by the temperature change can be suppressed, and when the light beam emitted from the light source is changed in wavelength, the generation of the spherical aberration can be suppressed by moving the collimator lens.

$$(\Delta SA3T/\Delta T) \times (\Delta SA3\lambda/\Delta\lambda) < 0 \quad (7)$$

$$\phi(h) = (C2 \times h^2 + C4 \times h^4 + C6 \times h^6 + C8 \times h^8 + C10 \times h^{10} + \ldots) \times \lambda/10^6 \text{ (mm)} \quad (8)$$

$$C2 \times C10 > 0 \quad (9)$$

$$\Delta SA3 \times \Delta SA5 > 0 \quad (10)$$

According to a third embodiment of the present invention, there is provided an optical pickup device, including: a light source that emits a light beam of a predetermined wavelength of about 405 nm; an objective lens being a plastic lens provided with, on at least one surface, diffraction means of a zone diffractive structure suppressing generation of aberration to be caused by a temperature change, and has a numerical aperture of 0.82 or larger for gathering the light beam emitted from the light source with respect to an optical disk; and a collimator lens disposed between the light source and the objective lens, and derives a substantially-collimated light by converting an angle of divergence of the light beam emitted from the light source. In the optical pickup device, the objective lens is formed to satisfy equation (11), where $\Delta SA3T$ is an amount of change of third-order spherical aberration to be generated in the objective lens in response to a temperature change $\Delta T$ (° C.) in a range from $-10°$ C. to $75°$ C., and $\Delta SA3\%$ is an amount of change of third-order spherical aberration to be generated in the objective lens in response to a wavelength change $\Delta\lambda$ (nm) within a range of $\pm 5$ nm observed in the light beam emitted from the light source, equation (13) is satisfied when a length of an optical path increased by the diffractive structure of the diffraction means is represented by an optical-path difference function $\phi(h)$ calculated by equation (12), where h (mm) is a height from an optical axis, Cn is an nth-order coefficient of an optical-path difference, and $\lambda$ (nm) is a wavelength of an incoming light beam, equation (14) is satisfied, where $\Delta SA3$ is an amount of change of third-order axial spherical aberration to be generated in the objective lens in response to the wavelength change $\Delta\lambda$ (nm), and $\Delta SA5$ is an amount of change of fifth-order axial spherical aberration, and with the objective lens, the generation of the spherical aberration to be caused by the temperature change can be suppressed, and when the light beam emitted from the light source is changed in wavelength, the generation of the spherical aberration can be suppressed by moving the collimator lens.

$$(\Delta SA3T/\Delta T) \times (\Delta SA3\lambda/\Delta\lambda) < 0 \quad (11)$$

$$\phi(h) = (C2 \times h^2 + C4 \times h^4 + C6 \times h^6 + C8 \times h^8 + C10 \times h^{10} + \ldots) \times \lambda/10^6 \text{ (mm)} \quad (12)$$

$$C4 \times C10 > 0 \quad (13)$$

$$\Delta SA3 \times \Delta SA5 > 0 \quad (14)$$

In the optical pickup device of the third embodiment above, the objective lens may be formed to satisfy equation (15) when a focal length thereof is f (mm).

$$f \times C2 \times \lambda > -85000 \quad (15)$$

According to a fourth embodiment of the present invention, there is provided an optical disk device, including, an optical pickup device provided with: a light source that emits a light beam of a predetermined wavelength of about 405 nm; an objective lens being a plastic lens provided with, on at least one surface, diffraction means of a zone diffractive structure suppressing generation of aberration to be caused by a temperature change, and has a numerical aperture of 0.82 or larger for gathering the light beam emitted from the light source with respect to an optical disk; and a collimator lens disposed between the light source and the objective lens, and derives a substantially-collimated light by converting an angle of divergence of the light beam emitted from the light source, and performing recording and/or reproduction of an information signal with respect to the optical disk by the optical pickup device. In the optical disk device, the objective lens is formed to satisfy equation (16), where $\Delta SA3T$ is an amount of change of third-order spherical aberration to be generated in the objective lens in response to a temperature change $\Delta T$ (° C.) in a range from $-10°$ C. to $75°$ C., and $\Delta SA3\lambda$ is an amount of change of third-order spherical aberration to be generated in the objective lens in response to a wavelength change $\Delta\lambda$ (nm) within a range of $\pm 5$ nm observed in the light beam emitted from the light source, equation (18) is satisfied when a length of an optical path increased by the diffractive structure of the diffraction means is represented by an optical-path difference function $\phi(h)$ calculated by equation (17), where h (mm) is a height from an optical axis, Cn is an nth-order coefficient of an optical-path difference, and $\lambda$ (nm) is a wavelength of an incoming light beam, equation (19) is satisfied, where $\Delta SA3$ is an amount of change of third-order axial spherical aberration to be generated in the objective lens in response to the wavelength change $\Delta\lambda$ (nm), and $\Delta SA5$ is an amount of change of fifth-order axial spherical aberration, and with the objective lens, the generation of the spherical aberration to be caused by the temperature change can be suppressed, and when the light beam emitted from the light source is changed in wavelength, the generation of the spherical aberration can be suppressed by moving the collimator lens.

$$(\Delta SA3T/\Delta T) \times (\Delta SA3\lambda/\Delta\lambda) < 0 \quad (16)$$

$$\phi(h) = (C2 \times h^2 + C4 \times h^4 + C6 \times h^6 + C8 \times h^8 + C10 \times h^{10} + \ldots) \times \lambda/10^6 \text{(mm)} \quad (17)$$

$$C4 \times C10 > 0 \quad (18)$$

$$\Delta SA3 \times \Delta SA5 > 0 \quad (19)$$

According to the embodiments of the invention, even when the oscillation wavelength shows a difference from the design wavelength due to manufacturing deviations or others occurred to a light source, an objective lens for use is so configured that an amount of change of third-order axial spherical aberration to be caused therein due to some wavelength change has a fixed relationship with an amount of change of fifth-order axial spherical aberration. This accordingly enables to correct and reduce the spherical aberration through adjustment of an optical system, extend the tolerance range of a difference from the design wavelength for the oscillation wavelength in the light source, increase the yield of the light source, and reduce the cost.

DESCRIPTION OF THE PREFERRED EMBODIMENT

In the below, by referring to the accompanying drawings, described are an optical pickup device 1 to which the invention is applied, and an optical disk device using the optical pickup device 1.

The optical pickup device 1 to which the invention is applied is for performing recording and reproduction of information with respect to an optical disk 8 being an optical recording medium. The optical pickup device 1 configures an optical disk device together with a spindle motor and a feed motor, for example. The spindle motor serves as drive means for rotating the optical disk 8 for operation, and the feed motor serves to move the optical pickup device 1 in the diameter direction of the optical disk. The optical pickup device 1 performs recording and reproduction of information with respect to the optical disk 8 being rotated and operated by the spindle motor.

The optical disk 8 in this example is a high-density-recording optical disk being capable of high-density recording using a semiconductor laser with a light-emitting wavelength of about 405 nm (bluish-violet region), for example. Note here that the invention is applicable not only to such an optical disk but also to an optical pickup device and an optical disk device that perform recording and/or reproduction with respect to an optical recording medium that is capable of optical recording and/or reproduction.

Figure 1:
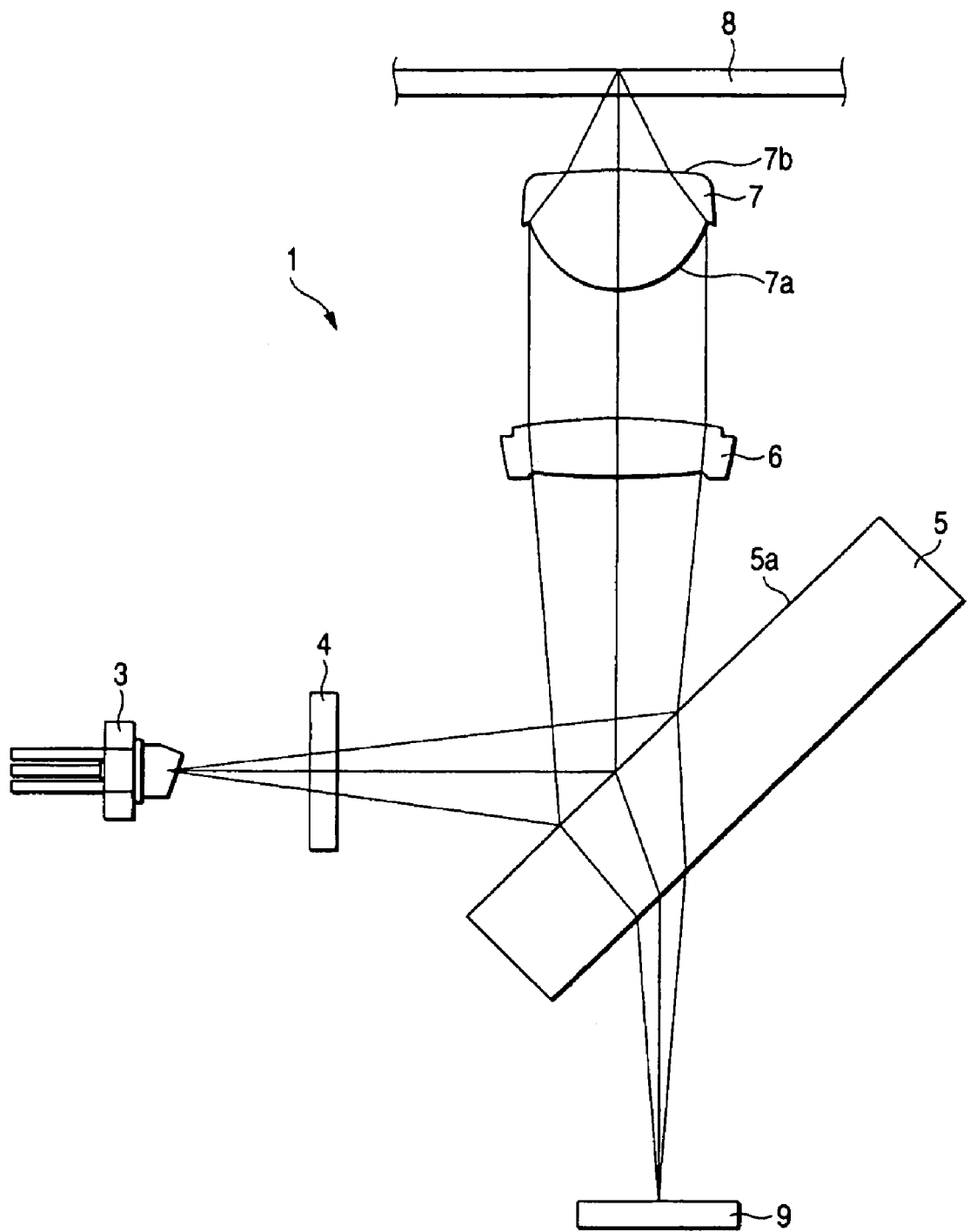
FIG. 1 is a ray diagram showing an optical system in an optical pickup device to which the invention is applied.

As shown in FIG. 1, the optical pickup device 1 to which the invention is applied is configured to include a light source section 3, a diffractive optical element 4, a beam splitter 5, a collimator lens 6, an objective lens 7, and a light detector 9. The light source section 3 emits light beams of a wavelength of about 405 nm, and the diffractive optical element 4 splits, into three, the light beams coming from the light source section 3. The beam splitter 5 reflects or passes through the light beams being the splitting results by the diffractive optical element 4, and the reflected lights coming from the optical disk 8. The objective lens 7 gathers the light beams coming from the light source section 3 onto the signal recording surface of the optical disk 8. The light detector 9 detects the returning light beams being the reflection results on the optical disk 8.

The light source section 3 is exemplified by a semiconductor laser, and includes a light-emitting section that emits light beams of a predetermined design wavelength of about 405 nm. Note here that the light beams coming from the light source section 3 do not necessarily have such a wavelength. The diffractive optical element 4 is disposed between the light source section 3 and the beam splitter 5, and includes a diffraction section for splitting, into three, the light beams coming from the light source section 3.

The beam splitter 5 is disposed on an optical path between the diffractive optical element 4 and the collimator lens 6, and includes a half mirror surface 5a on the side closer to the light source section 3. The beam splitter 5 serves to reflect, to the side of the optical disk 8 by the half mirror surface 5a, the incoming light beams being the results of splitting into three by the diffractive optical element 4. The beam splitter 5 also passes through the returning light beams being the reflection results on the optical disk 8, and directs the light beams to the side of the light detector 9. That is, the beam splitter 5 is an optical element that separates the optical path for the returning light beams from the optical path for the going light beams.

The collimator lens 6 is disposed between the beam splitter 5 and the objective lens 7 for use as means for converting an angle of divergence of light beams passing therethrough. By converting an angle of divergence of the light beams originally from the light source section 3 and reflected by the beam splitter 5 as such, the collimator lens 6 substantially collimates the light beams, thereby deriving substantially-collimated lights.

This collimator lens 6 is moved when the oscillation wavelength varies when the light source section 3 shows any manufacturing deviations or others. By being moved as such, through conversion of an angle of divergence of light beams, the collimator lens 6 allows the light beams to enter the objective lens 7 while being converged slightly more than the collimated lights. This accordingly enables to reduce any spherical aberration to be caused by a variation of the oscillation wavelength by making the lights to pass through the objective lens 7. Note that, in this example, the light beams entering the objective lens 7 are converged by moving the collimator lens 6. This is surely not restrictive, and the spherical aberration to be caused by a variation of the oscillation wavelength may be reduced by the light beams entering the objective lens 7 while being diverged.

Note that exemplified here is the case of moving the collimator lens 6 only when any wavelength change is observed due to the varying oscillation wavelength. This is surely not restrictive, and when the optical pickup device 1 is of a type performing recording and/or reproduction of information with respect to a multi-layer optical disk including a plurality of recording layers, the collimator lens 6 may be so configured as to be moved for forming a beam spot of light beams appropriately for each of the recording layers. It means that the invention is applicable also to an optical pickup device performing recording and/or reproduction of information with respect to an optical disk including one or more recording layers in a direction from which light beams come.

The objective lens 7 gathers light beams on the signal recording surface of the optical disk 8. The light beams here are those substantially collimated by the collimator lens 6. On the side of the objective lens 7 from which lights come, an aperture stop (not shown) is provided. This aperture stop is in charge of aperture control, i.e., apply control to derive any desired numerical aperture for light beams entering the objective lens 7.

This objective lens 7 is a plastic-made single objective lens with a numerical aperture (NA) of 0.82 or larger, and both surfaces thereof, i.e., a first surface 7a on the light-entering side and a second surface 7b on the light-exiting side, are non-spherical. The objective lens 7 is provided with, on at least one of the surfaces as a piece, diffraction means of a diffractive structure, i.e., diffractive lens structure. The diffraction means is of the structure with very small height differences in zone for suppressing any aberration resulted from any temperature change. The objective lens 7 gathers incoming light beams onto the optical disk 8. The light beams are those originally from the light source section 3, reflected by the beam splitter 5, and directed to the objective lens 7 via the collimator lens 6. As such, the diffraction means of the objective lens 7 functions as if compensating the generated aberration resulted from some temperature change, i.e., the generated aberration resulted from some change observed in the lens in terms of shape and index of refraction caused by the temperature change, thereby preventing generation of spherical aberration resulted from any temperature change typical of plastic lenses.

As to the objective lens 7, the both surfaces are each in any predetermined non-spherical shape so as to satisfy equation (20) below, where $\Delta SA3T$ is an amount of change of third-order axial spherical aberration observed in the objective lens 7 if with a temperature change by an arbitrary amount of change $\Delta T$ (° C.) in a range from −10° C. to 75° C., and $\Delta SA3\lambda$ is an amount of change of third-order axial spherical aberration observed in the objective lens 7 if with a wavelength change by an arbitrary amount of change $\Delta\lambda$ (nm) in a range of ±5 nm with respect to the wavelength of light beams coming from the light source section 3, i.e., predetermined wavelength of about 405 nm. Hereinafter, $\Delta SA3T$ is also referred to as "amount of change of third-order axial spherical aberration observed in the objective lens 7 in response to a temperature change $\Delta T$ (° C.)", and $\Delta SA3\lambda$ is also referred to as "amount of change of third-order axial spherical aberration observed in the objective lens 7 in response to a wavelength change Δλ (nm)". The objective lens 7 is provided with predetermined diffraction means on at least one of the surfaces.

$$(\Delta SA3T/\Delta T) \times (\Delta SA3\lambda/\Delta\lambda) < 0 \quad (20)$$

The diffractive lens structure is so formed as to satisfy equation (22) below when a length of an optical path increased by the diffractive structure of the diffraction means in the objective lens 7 is represented by an optical-path difference function φ(h) calculated by equation (21) below, where h (mm) is a height from an optical axis, Cn is an nth-order coefficient of an optical-path difference, and λ (nm) is a wavelength of an incoming light beam.

$$\phi(h) = (C2 \times h^2 + C4 \times h^4 + C6 \times h^6 + C8 \times h^8 + C10 \times h^{10} + \ldots) \times \lambda/10^6 \text{ (mm)} \quad (21)$$

$$C2 \times C10 > 0 \quad (22)$$

The objective lens 7 is also so formed as to satisfy equation (23) below, where ΔSA3 and ΔSA5 are of the same sign, i.e., ΔSA3 is an amount of change of third-order axial spherical aberration generated in the objective lens in response to a wavelength change by an amount of change Δλ (nm), and ΔSA5 is an amount of change of fifth-order axial spherical aberration.

$$\Delta SA3 \times \Delta SA5 > 0 \quad (23)$$

Note here that the objective lens 7 is so configured as to sufficiently suppress the third-order axial spherical aberration and the fifth-order axial spherical aberration even with respect to light beams of an oscillation wavelength showing no difference from the design wavelength.

As such, the objective lens 7 is configured to satisfy any fixed relationship, i.e., equation (23), between ΔSA3 (an amount of change of third-order axial spherical aberration) and ΔSA5 (an amount of change of fifth-order axial spherical aberration), which are to be generated in the objective lens 7 by some wavelength change observed in light beams coming from the light source section 3, i.e., by a difference between the oscillation wavelength and the design wavelength due to a variation of the oscillation wavelength caused by manufacturing deviations or others of the light source section 3. Such a configuration of the objective lens 7 enables to correct and reduce any spherical aberration resulted from such a wavelength change by adjusting an angle of divergence of lights entering the objective lens 7. The angle of divergence here includes an angle of convergence, and such angle adjustment is made by adjusting an optical system, e.g., moving the collimator lens 6. That is, in a previous device for recording and/or reproduction of information with respect to a so-called high-density-recording optical disk with a numerical aperture of 0.82 or larger and the wavelength in use is of about 405 nm, an objective lens causes spherical aberration of a level not permissible due to a variation occurred to the oscillation wavelength in a light source. There thus has been required to strictly control the light source in terms of tolerance value of manufacturing deviations. On the other hand, with the objective lens 7, even when any wavelength change is observed in light beams coming from a light source, any spherical aberration can be corrected and reduced by adjusting an optical system so that the tolerance range of a difference, from the design wavelength, of the oscillation wavelength in the light source can be extended. As such, when the objective lens 7 is used for an optical pickup device and an optical disk device that perform recording and/or reproduction of information with respect to a so-called high-density-recording optical disk, the tolerance range can be extended for the oscillation wavelength in a light source, i.e., the tolerance range of manufacturing deviations can be increased for a light source, and the aberration can be sufficiently reduced. Moreover, the yield of the light source can be increased, thereby enabling the reduction of the cost for the light source and the entire device.

Described now in more detail are the effects of the optical pickup device 1 to which the invention is applied and the objective lens 7 configuring the optical pickup device 1, i.e., the effects of extending the tolerance range of an oscillation wavelength in a light source.

With an optical pickup device for use with a so-called high-density-recording optical disk with the numerical aperture of 0.82 or larger and the wavelength in use of about 405 nm, if the oscillation wavelength of a semiconductor laser or others shows a difference from the design wavelength, the spherical aberration to be generated in an objective lens cannot be of a tolerable level. As such, considered is a method of cancelling out the spherical aberration through adjustment of an angle of divergence of light beams entering the objective lens by moving the collimator lens or others.

When light beams whose oscillation wavelength is with a difference of Δλ (nm) from the design wavelength are directed into an objective lens formed based on the design wavelength, adjusting an angle of divergence of the light beams entering the objective lens can cancel out ΔSA3 being the amount of change of third-order axial spherical aberration generated in the objective lens, and at the same time, suppress ΔSA5 being the amount of change of fifth-order axial spherical aberration as long as equation of ΔSA3×ΔSA5>0 is satisfied. This is because when the light beams entering the objective lens are changed in angle of divergence, the resulting third-order spherical aberration and fifth-order spherical aberration are of the same sign.

Moreover, the objective lens 7 of the diffractive structure is desirably formed to satisfy equation (22), where C2 and C10 are a second-order coefficient and a tenth-order coefficient, respectively, of an optical path difference when equation (20) above is satisfied, and when the length of an optical path increased by the diffractive structure is φ(h) represented by equation (21). In equation (20), ΔSA3T is an amount of change of third-order axial spherical aberration to be generated in the objective lens 7 in response to a temperature change ΔT (° C.), and ΔSA3λ is an amount of change to be generated in the objective lens 7 in response to a wavelength change Δλ(nm).

With equation (23) satisfied by equations (20) to (22) being satisfied as such, when the light beams whose oscillation wavelength is with a difference of Δλ (nm) from the design wavelength are directed to the objective lens 7, the resulting ΔSA3 being the third-order axial spherical aberration and ΔSA5 being the fifth-order axial spherical aberration generated in the objective lens 7 are of the same sign. This accordingly enables to suppress both ΔSA3 and ΔSA5 by adjusting the angle of divergence of the light beams entering the objective lens 7. On the other hand, with equation (23) not satisfied between ΔSA3 being the third-order axial spherical aberration and ΔSA5 being the fifth-order axial spherical aberration because equations (20) to (22) are not satisfied, even if the light beams entering the objective lens are adjusted in angle of divergence for correcting the third-order axial spherical aberration, the absolute value of the fifth-order axial spherical aberration is increased, thereby not being able to sufficiently suppress the aberration.

As such, in an objective lens with a high numerical aperture and for use with a short wavelength, as with the objective lens 7 configuring the optical pickup device 1 to which the invention is applied, the amounts of change to be generated when the oscillation wavelength shows a difference from the design wavelength are made to be of the same sign, i.e., the amount of change of third-order axial spherical aberration and the amount of change of fifth-order axial spherical aberration. This accordingly enables to correct the spherical aberration through adjustment of an optical system so that the tolerance range of the oscillation wavelength can be extended in a semiconductor laser. This also enables to increase the yield of the semiconductor laser, thereby being able to reduce the cost for manufacturing the whole optical pickup device.

For such an objective lens configuring the optical pickup device, the material of plastic has been considered preferable in view of moldability and low cost, but the plastic lens has disadvantages of spherical aberration to be caused by any temperature change. However, the objective lens 7 of the above configuration is capable of solving such disadvantages with the above-described diffractive structure thereof. The objective lens 7 of such an aberration-preventing diffractive structure also solves the problem of spherical aberration to be generated when light beams entering thereinto are changed in wavelength.

That is, the objective lens 7 is configured not only to be able to correct any aberration resulted from some temperature change but also to be able to suppress, to the limit, the aberration resulted from some wavelength change by adjusting the incoming light beams in angle of divergence or convergence by moving the collimator lens 6.

The objective lens 7 is so formed that equation (24) below is satisfied by the relationship between the focal length f (mm) thereof and the second-order coefficient C2 of the optical-path difference described above.

$$-1.1 \times 10^2 < C2/f < 1.3 \times 10^1 \qquad (24)$$

With the objective lens 7 formed to satisfy equation (24) above as such, equation (23) can be satisfied with ease, and there are advantages of being able to increase the shortest pitch by increasing the pitch of the rim side of the diffractive structure, i.e., by increasing the pitch of the rim side of the diffractive structure where the pitch is small, so that the diffractive structure can be processed with ease. Moreover, the tolerance range of the manufacturing deviations can be extended for making full use of the capabilities of the diffractive structure. In other words, with the objective lens 7 satisfying equation (24), equation (23) can be satisfied with ease in the state of making full use of the manufacturing advantages with the shortest pitch being kept large in the diffractive structure. Accordingly, when light beams whose oscillation wavelength is with a difference of $\Delta\lambda$ (nm) from the design wavelength are directed to the objective lens 7, the resulting $\Delta SA3$ being the third-order axial spherical aberration and $\Delta SA5$ being the fifth-order axial spherical aberration generated in the objective lens are of the same sign. This accordingly enables to suppress both $\Delta SA3$ and $\Delta SA5$ by adjusting the angle of divergence of the light beams entering the objective lens.

The objective lens 7 is also so formed that equation (25) below is satisfied by the relationship among the focal length f (mm) thereof, the second-order coefficient C2 of the optical-path difference described above, and the wavelength $\lambda$ (nm) of incoming light beams.

$$f \times C2 \times \lambda > -85000 \qquad (25)$$

Figure 2:
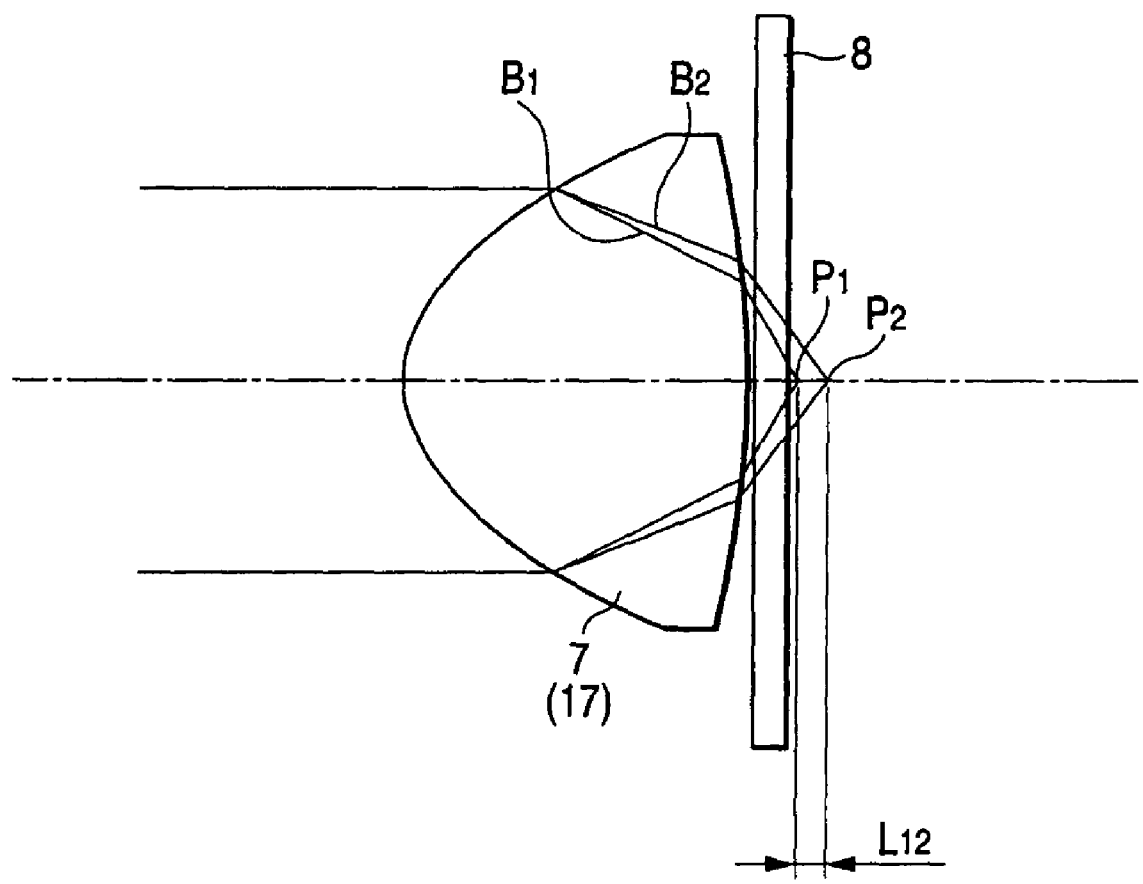
FIG. 2 is a diagram showing, when an objective lens configuring the optical pickup device to which the invention is applied shows a change of a wavelength, an optical distance in an optical axis direction between light-gathering positions before and after the change.

As shown in FIG. 2, as is formed to satisfy equation (25) above, the objective lens 7 is so formed as to have a distance of 0.5 µm or smaller for a distance L12 between light-gathering positions P1 and P2 in an optical axis direction when light beams coming from the light source section 3 have an arbitrary wavelength $\lambda$ (nm) in a range from 400 nm to 410 nm. At the light-gathering position P1, the light beams coming from the light source section 3 are gathered by the objective lens 7, and at the light-gathering position P2, the light beams coming from the light source 3 are gathered thereby when the light beams show a wavelength change, to the side of a long wavelength, of only 1 nm with respect to the arbitrary wavelength of $\lambda$ (nm). Note that, in FIG. 2, a reference character B1 denotes the light beams of the wavelength $\lambda$ (nm), and a reference character B2 denotes the light beams of the wavelength $\lambda+1$ (nm).

That is, when an optical distance in the optical axis direction from any arbitrary reference position to the light-gathering position P1 is L1, and when an optical distance in the optical axis direction from the reference position to the light-gathering position P2 is L2, the absolute value of the difference of a distance between the light-gathering positions L1 and L2 (L1–L2), i.e., (|L1–L2|), will be 0.5 µm or smaller. The reference position here may be the vertex of the surface of the objective lens 7 on the optical disk side. Note that exemplified here is the relationship between the arbitrary wavelength $\lambda$ (nm) and the wavelength $\lambda+1$ (nm), which is the one shifting the wavelength $\lambda$ to the side of a long wavelength by 1 nm. This relationship is about the relative distances of the two light-gathering positions as described above, and therefore, as long as with the objective lens satisfying such a relationship, the distance of 0.5 µm or smaller in the optical axis direction can be also derived between two light-gathering positions, i.e., a light-gathering position of gathering light beams of any arbitrary wavelength $\lambda$ (nm) in a range from 400 nm to 410 nm, and a light-gathering position of gathering light beams of a wavelength $\lambda-1$ (nm), which is the one shifting the wavelength $\lambda$ to the side of a short wavelength by 1 nm.

As such, the objective lens 7 is so formed as to have the distance L12 of 0.5 µm or smaller in the optical axis direction between the light-gathering position P1 of gathering thereby the light beams coming from the light source section 3 when the light beams are of any arbitrary wavelength $\lambda$ (nm), and the light-gathering position P2 of gathering thereby the light beams coming from the light source section 3 when a wavelength change of 1 nm, to the side of a long-wavelength, is observed in the light beams with respect to the arbitrary wavelength $\lambda$ (nm). As such, even if the light beams coming from the light source section 3 show some change in wavelength, a beam spot can be protected from blurring, i.e., any possible chromatic aberration can be sufficiently reduced.

In the objective lens 7, the diffractive structure of the diffraction means is preferably so formed as to select a diffraction order m of satisfying 98%<$\mu_m$ (where $\mu_m$ is the diffraction efficiency of the diffraction order m) in a wavelength range of 400 nm to 410 nm. For selection of the diffraction order m, the order of 4 or 5 is considered desirable in view of wavelength tolerance and easy processability.

Figure 3:
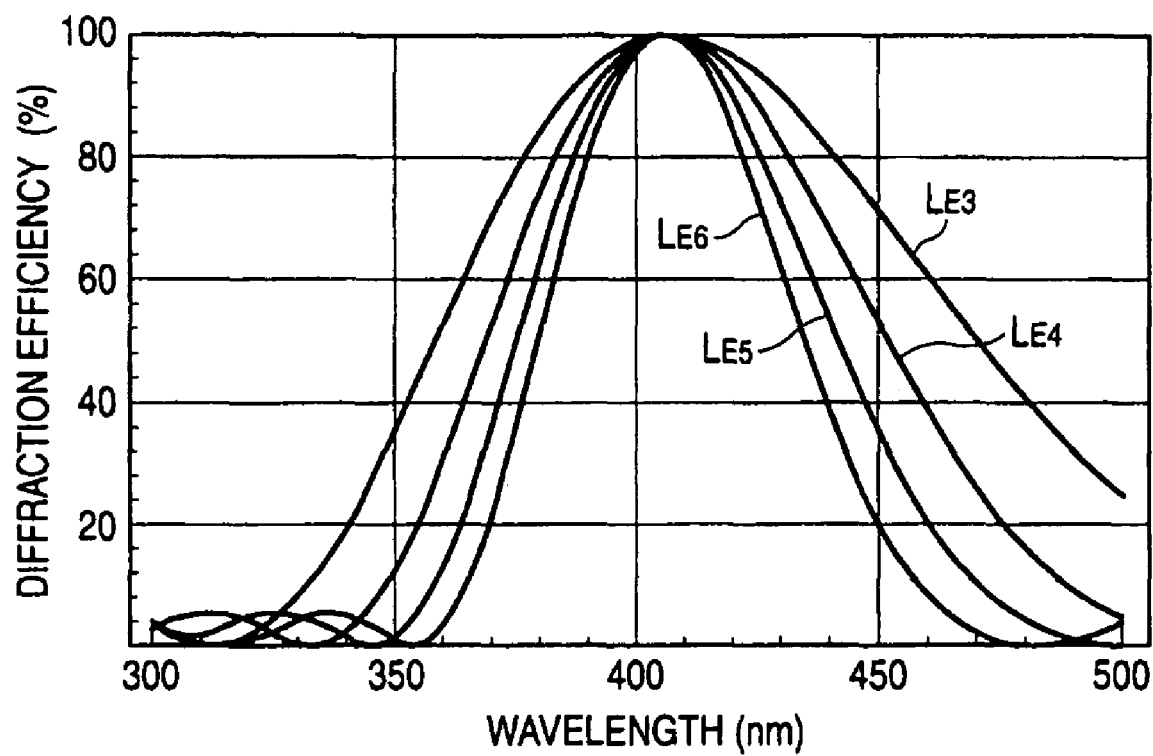
FIG. 3 is a diagram for illustrating any optimum order to be selected for diffraction order showing the maximum diffraction efficiency in the diffractive structure of the objective lens configuring the optical pickup device to which the invention is applied, i.e., a diagram showing a change of the diffraction efficiency observed in a diffracted light of the selected diffraction order when an incoming light beam is changed in wavelength in the diffractive structure, which is so formed as to maximize, respectively, the diffraction efficiency of the diffracted lights of third-order, fourth-order, fifth-order, and sixth-order with respect to the light beam of a wavelength of 405 nm.
Figure 4:
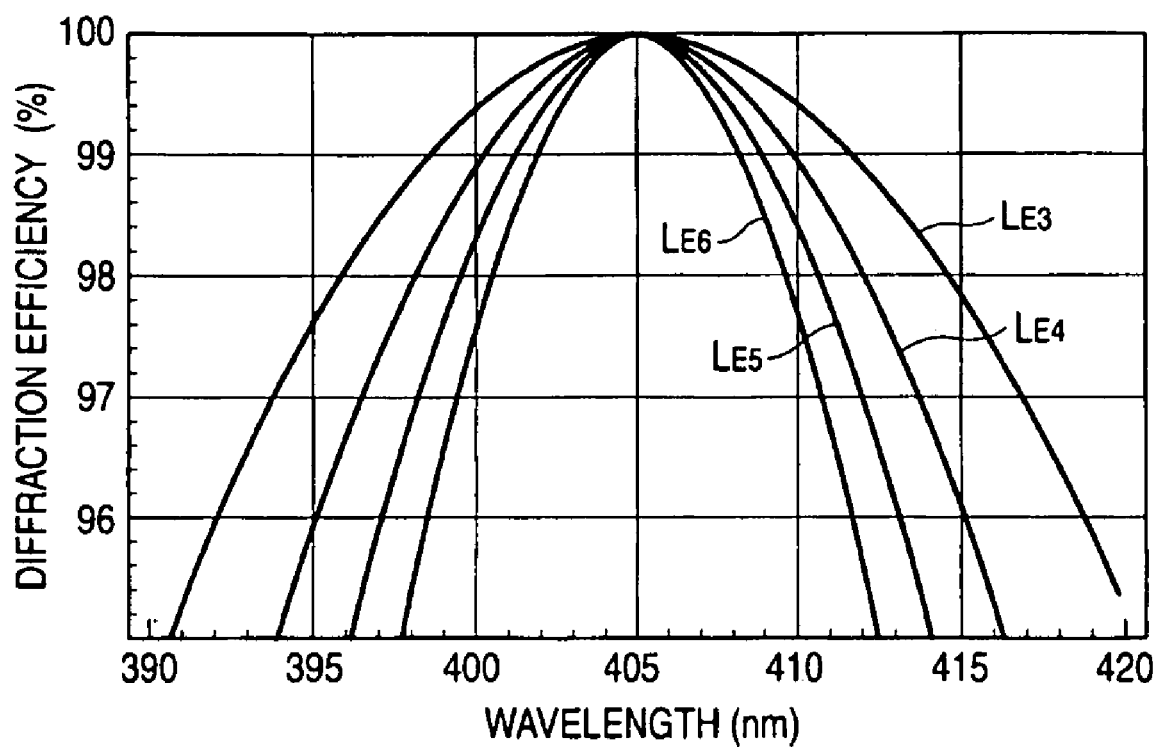
FIG. 4 is an enlarged view of a main portion of FIG. 3, i.e., the diagram showing a change of the diffraction efficiency of FIG. 3.

That is, with the lower diffraction order m, as shown in FIGS. 3 and 4, the spectrum of the diffraction efficiency is expanded, and the tolerance range is extended with respect to the wavelength, thereby being able to extend the wavelength range for the light source available for use. Note that FIG. 3 is a diagram showing a change of the diffraction efficiency observed in a diffracted light of the selected diffraction order when an incoming light beam is changed in wavelength in the diffractive structure, which is so formed as to maximize, respectively, the diffraction efficiency of the diffraction order of 3, 4, 5, and 6 with respect to the light beam of a wavelength of 405 nm. FIG. 4 is an enlarged view of a portion of the vertex in FIG. 3, i.e., a portion of the wavelength of 390 nm to 420 nm. In FIGS. 3 and 4, a reference character LE3 denotes a change of the diffractive efficiency if with the diffraction order of 3, a reference character LE4 denotes a change of the diffractive efficiency if with the diffraction order of 4, a reference character LE5 denotes a change of the diffractive efficiency if with the diffraction order of 5, and a reference character LE6 denotes a change of the diffractive efficiency if with the diffraction order of 6. As is evident from FIGS. 3 and 4, with the higher diffraction order, the slope of the wavelength dependence looks sharp, i.e., the change of the diffractive efficiency is increased with respect to any wavelength change, so that the degree of tolerance with respect to any wavelength change is reduced. In other words, with the lower diffraction order, the slope of the wavelength dependence becomes gentle, i.e., the change of diffractive efficiency is suppressed to be small with respect to the wavelength change, so that the degree of tolerance with respect to any wavelength change can be increased.

Moreover, with the higher diffraction order m, as will be described later, the shortest pitch is increased in the resulting diffractive structure so that the tolerance range is extended with respect to any possible processing error. This accordingly extends the tolerance range of the manufacturing deviations for making full use of the capabilities of the diffractive structure, and also leads to easy manufacturing.

In consideration of such mutually contradictory tendency, the diffracted lights for use with the objective lens 7 are preferably of fourth- or fifth-order as described above. That is, with the diffractive structure formed to have the diffracted lights being dominant have the diffraction order of 4 or 5, i.e., the diffracted lights with the maximum diffraction efficiency, the tolerance degree can be further extended with respect to a wavelength change, and the resulting shape can be easy to process in view of manufacturing.

The light detector 9 is provided with a photo detector for receiving light beams reflected on the signal recording surface of the optical disk 8. The light detector 9 serves to detect not only information signals but also various types of signals such as tracking error signals and focus error signals.

Based on a focus servo signal and a tracking servo signal generated by returning lights detected by the light detector 9, the optical pickup device 1 configured as such drives the objective lens 7 for focus servo and tracking servo. As is driven by the optical pickup device 1, the objective lens 7 is moved to a focus position where the focus is set on the signal recording surface of the optical disk 8. With the objective lens 7 moved as such, the light beams come into focus on the recording surface of the optical disk 8 so that information recording or reproduction is performed to/from the optical disk 8.

With the provision of such an objective lens 7, the optical pickup device 1 and the optical disk device to which the invention is applied are so configured as to, even with any wavelength change observed in light beams coming from the light source section 3, satisfy a fixed relationship, i.e., equation (23), between $\Delta SA3$ being an amount of change of third-order axial spherical aberration generated in the objective lens 7 in response to the wavelength change and $\Delta SA5$ being an amount of change of fifth-order axial spherical aberration. This accordingly enables to correct and reduce any spherical aberration resulted from the wavelength change by adjusting the optical system, i.e., enables to increase the tolerance range of the manufacturing deviations for the light source section 3, and realize the increase of yield and the reduction of cost.

That is, even when the oscillation wavelength in the light source section 3 shows a difference from the design wavelength due to a variation occurred to the oscillation wavelength due to the manufacturing deviations of a semiconductor laser or others, in the optical pickup device 1 and the optical disk device to which the invention is applied, any spherical aberration resulted from such a difference of the oscillation wavelength from the design wavelength can be corrected and reduced by moving the collimator lens 6 or others. That is, the tolerance range can be extended for the manufacturing deviations in the light source section, thereby realizing the increase of yield and the reduction of cost. In an exemplary case where the invention is applied to an optical pickup device and an optical disk device that perform recording and/or reproduction with respect to an optical disk including a plurality of recording layers, moving the collimator lens gathers light beams onto all of the recording layers while suppressing generation of aberration, for example. In such a case, if an objective lens configured as above is additionally provided, any possible spherical aberration can be suppressed among a plurality of recording layers so that the aberration can be suppressed to a further degree. Accordingly, the tolerance range can be extended for the manufacturing deviations in the light source section, thereby being able to realize the increase of yield and the reduction of cost.

The optical pickup device 1 and the optical disk device to which the invention is applied serve effective especially when an objective lens in use is with a high numerical aperture (NA) of 0.82 or larger and is for a short wavelength of about 405 nm. Accordingly, even when some wavelength change is observed in light beams coming from the light source section 3, any possible spherical aberration resulted from the wavelength change can be corrected and reduced by adjusting the optical system, i.e., the tolerance range can be increased for the manufacturing deviations in the light source section 3, thereby realizing the increase of yield and the reduction of cost.

Moreover, the optical pickup device 1 and the optical disk device to which the invention is applied are so configured as to satisfy equation (25) above when the focal length of the objective lens is f (mm). This enables to derive the distance L12 of 0.5 μm or smaller in the optical axis direction between light-gathering positions before and after a wavelength change of 1 nm in light beams. As such, even if the light beams coming from the light source section 3 shows some change in wavelength, a beam spot can be protected from blurring, i.e., any possible chromatic aberration can be sufficiently reduced.

Described below with specific numerical values are examples of 1 to 6 of an objective lens configuring the optical pickup device to which the invention is applied. Prior to describing Examples 1 to 6, described first is a comparative example for comparison use with the invention.

In the comparative example and Examples 1 to 6 below, in the objective lens 7, a first surface 7a is located on the side of a light source, and a second surface 7b is located on the side of an optical disk. The design wavelength is 405 nm. A reference character f denotes the focal length (mm) of the objective lens, a reference character R denotes the radius of curvature (mm) of the objective lens, a reference character d denotes the thickness (mm) of the objective lens at the optical axis position, a reference character n denotes the index of refraction with the wavelength (405 nm) of the objective lens, and a reference character NA denotes the numerical aperture of the objective lens when light beams are gathered thereby onto the optical disk. Moreover, a reference character t denotes the thickness (μm) of the optical disk, and a reference character nt denotes the index of refraction with the design wavelength (405 nm) of the optical disk. In the comparative example and Examples 1 to 6 below, t=87.5 (μm), and nt=1.6.

The first and second surfaces 7a and 7b of the objective lens 7 are shaped non-spherical, and the non-spherical shape is provided by equation (26) below. Note that, in equation (26), a reference character h denotes the distance (mm) from the optical axis, a reference character Z(h) denotes the distance (mm) from the tangent plane of the surface vertex of the non-spherical surface at the position with the distance h from the optical axis, a reference character K denotes the conical constant, and a reference $A_i$ denotes the non-spherical surface coefficient of ith-order.

$$Z(h) = \frac{h^2/R}{1 + \sqrt{1 - (1+K)h^2/R^2}} + \sum_{i=2} A_i h^i \quad (26)$$

Moreover, presumably, the length of an optical path increased by the diffractive structure formed to at least one surface of the objective lens 7 is provided by $\phi$ (h) of equation (21) above including h, Cn, and $\lambda$. Note that, in each of Examples 1 to 6 below, exemplified is a case where the diffractive structure is provided as a piece to the first surface 7a. This is surely not restrictive, and providing the diffractive structure to the second surface 7b as above can also lead to the similar effects.

COMPARATIVE EXAMPLE

In the objective lens of the comparative example, the reference characters f, n, d, and NA are as below.
f: 1.41 [mm]
n: 1.525
d: 1.68 [mm]
NA: 0.85

The reference characters R, K, and $A_i$ representing the shape of the first surface on the light-entering side of the objective lens of the comparative example are as below. The nth-order coefficient Cn of an optical-path difference determining the length of increase $\phi$ (h) of the optical path by the zone diffractive structure provided to the first surface is as below.
Shape of First Surface
R: 1.039 [mm]
K: −0.551
$A_4$: $1.425 \times 10^{-2}$
$A_6$: $-1.970 \times 10^{-2}$
$A_8$: $5.117 \times 10^{-3}$
$A_{10}$: $7.083 \times 10^{-3}$
$A_{12}$: $-6.01 \times 10^{-3}$
$A_{14}$: $3.553 \times 10^{-3}$
$A_{16}$: $-4.494 \times 10^{-3}$
$A_{18}$: $6.077 \times 10^{-3}$
$A_{20}$: $-2.658 \times 10^{-3}$
C2: −165.01
C4: −36.61
C6: −34.48
C8: 3.31
C10: 3.03

The reference characters R, K, and $A_i$ representing the shape of the second surface on the light-exiting side of the objective lens of the comparative example are as below.
Shape of Second Surface
R: −2.215 [mm]
K: −128.141
$A_4$: $5.064 \times 10^{-1}$
$A_6$: −1.102
$A_8$: $1.353 \times 10^{-2}$
$A_{10}$: 3.658
$A_{12}$: −6.56
$A_{14}$: 4.712
$A_{16}$: −1.098

Figure 5:
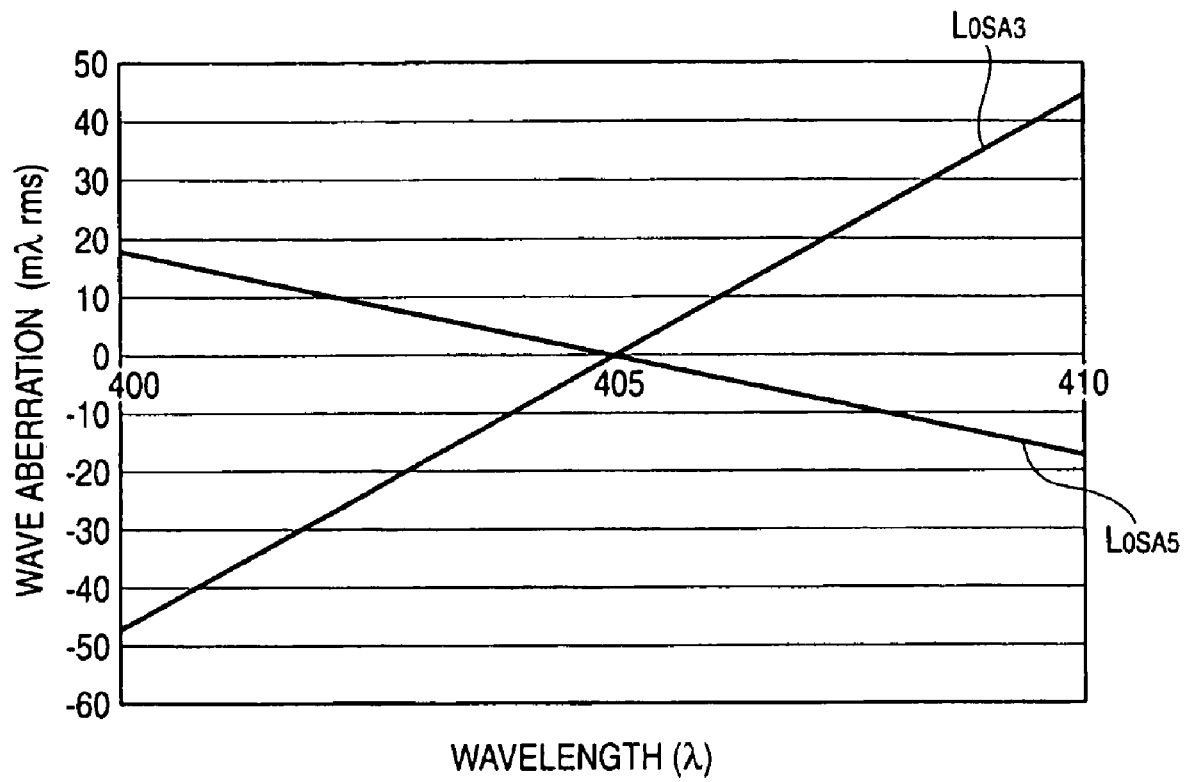
FIG. 5 is a diagram showing the characteristics of aberration caused by a wavelength variation observed in an objective lens of a comparative example, which is for comparison use with the objective lens configuring the optical pickup device to which the invention is applied, i.e., a characteristic diagram showing a change caused by a wavelength variation between the third-order spherical aberration and the fifth-order spherical aberration.

In such design requirements, as a result of some wavelength change, any change observed between SA3 being the third-order spherical aberration and SA5 being the fifth-order spherical aberration is derived as shown in FIG. 5. Note that, $L_{OSA3}$ in FIG. 5 denotes a change of the third-order spherical aberration SA3 as a result of any wavelength change, and $L_{OSA5}$ denotes a change of the fifth-order spherical aberration SA5 as a result of any wavelength change. Also in FIG. 5, the lateral axis denotes the wavelength ($\lambda$), and the vertical axis denotes the amount of aberration (m$\lambda$rms).

In the design requirements above, the third-order spherical aberration on the axis is −0.9 m$\lambda$rms, and the fifth-order spherical aberration is 0.5 m$\lambda$rms, which are both suppressed to be sufficiently small.

The change of third-order spherical aberration with respect to a temperature change $\Delta T$ (° C.), i.e., $\Delta SA3T/\Delta T$, is −0.5 m$\lambda$rms/° C., and the change of third-order spherical aberration with respect to a wavelength change $\Delta \lambda$ (nm), i.e., $\Delta SA3\lambda/\Delta \lambda$, is 8.9 m$\lambda$rms/nm. As such, $(\Delta SA3T/\Delta T) \cdot (\Delta SA3\lambda/\Delta \lambda) < 0$ is thus established so that equation (20) above is satisfied.

However, with $C2 \times C10 < 0$, equation (22) above is not satisfied. Therefore, as shown in FIG. 5, when the oscillation wavelength is shifted by 1 nm to the side of a long wavelength from the design wavelength of 405 nm, $\Delta SA3$ being the amount of change of third-order axial spherical aberration to be generated in the objective lens is 8.9 m$\lambda$rms, and $\Delta SA5$ being the amount of change of fifth-order axial spherical aberration is −3.4 m$\lambda$rms. As such, with resulting $\Delta SA3 \times \Delta SA5 < 0$, equation (23) above is not satisfied.

As described above, the resulting third-order axial spherical aberration generated as such can be cancelled out by directing converged lights to the objective lens through adjustment of the optical system, e.g., moving a collimator lens. With the objective lens of such design requirements, the third-order spherical aberration to be generated by a change of the scaling factor by 0.01 is −285 m$\lambda$rms, and the fifth-order spherical aberration is −51 m$\lambda$rms. If the scaling factor is so adjusted as to cancel out $\Delta SA3$, the fifth-order axial spherical aberration will be −5.0 m$\lambda$rms, thereby resulting in the increase of an absolute value thereof.

As such, when the objective lens of the comparative example configured as such is used for the optical pickup device or others, spherical aberration of not a tolerable level is caused due to a variation of an oscillation wavelength, and the resulting spherical aberration is not correctable. As a result, the tolerance degree of the oscillation wavelength with respect to the design wavelength is limited in a semiconductor laser, thereby resulting in a problem of causing the reduction of the yield.

Described next are objective lenses in the examples of 1 to 6 for use in the optical pickup device and the optical disk device of the embodiments of the invention, which all solve the problems of such an objective lens of the comparative example, i.e., an objective lens of a previous type.

EXAMPLE 1

In the objective lens of Example 1, the reference characters f, n, d, and NA are as below.
  f: 1.41 [mm]
  n: 1.525
  d: 1.85 [mm]
  NA: 0.85

The reference characters R, K, and $A_i$ representing the shape of the first surface on the light-entering side of the objective lens of Example 1 are as below. The nth-order coefficient Cn of an optical-path difference determining the length of increase $\phi$ (h) of the optical path by the zone diffractive structure provided to the first surface is as below.
  Shape of First Surface
  R: 1.046 [m]
  K: −0.554
  $A_4$: $1.641 \times 10^{-2}$
  $A_6$: $-8.571 \times 10^{-3}$
  $A_8$: $8.203 \times 10^{-3}$
  $A_{10}$: $3.916 \times 10^{-3}$
  $A_{12}$: $-7.085 \times 10^{-3}$
  $A_{14}$: $3.855 \times 10^{-3}$
  $A_{16}$: $-6.722 \times 10^{-3}$
  $A_8$: $8.292 \times 10^{-3}$
  $A_{20}$: $-3.508 \times 10^{-3}$
  C2: −132.20
  C4: −25.27
  C6: −17.98
  C8: 7.35
  C10: −4.97

Figure 6:
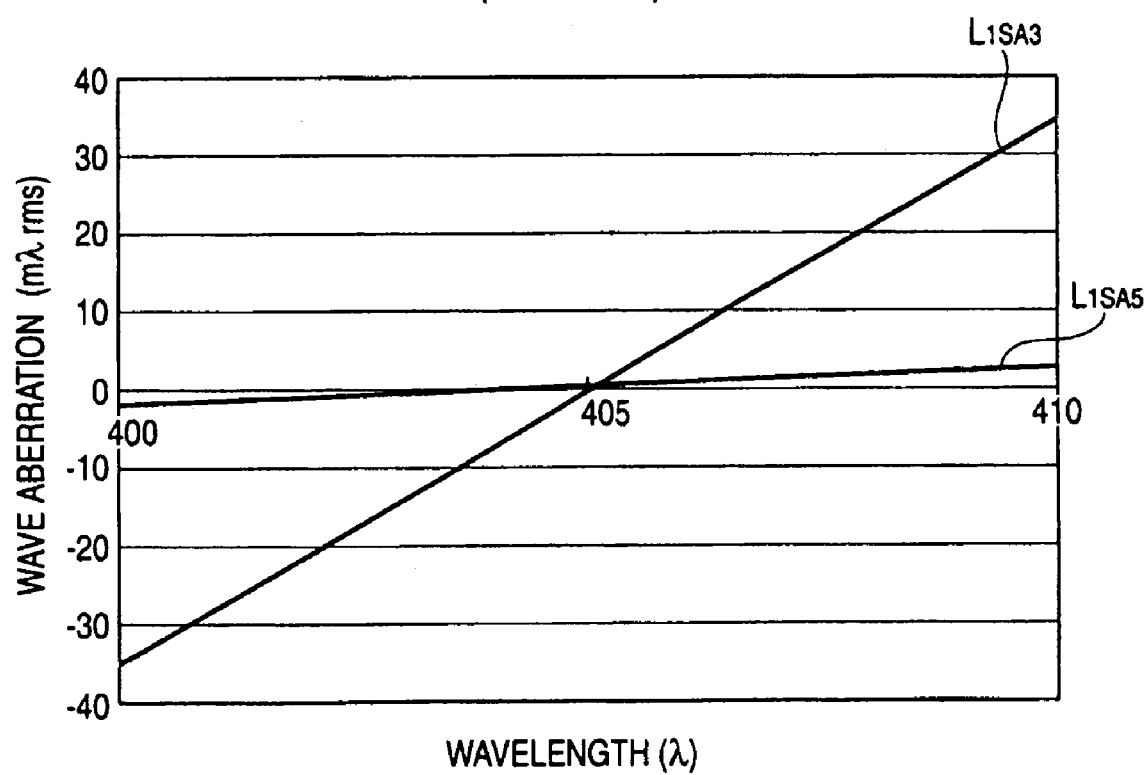
FIG. 6 is a diagram showing the characteristics of aberration caused by a wavelength variation observed in an objective lens of an example 1 configuring the optical pickup device to which the invention is applied, i.e., a characteristic diagram showing a change caused by a wavelength variation between the third-order spherical aberration and the fifth-order spherical aberration.

The reference characters R, K, and $A_i$ representing the shape of the second surface on the light-exiting side of the objective lens of Example 1 are as below.
  Shape of Second Surface
  R: −1.369 [mm]
  K: −63.992
  $A_4$: $5.139 \times 10^{-1}$
  $A_6$: −1.177
  $A_8$: $3.819 \times 10^{-2}$
  $A_{10}$: 3.387
  $A_{12}$: −4.78
  $A_{14}$: 2.19
  $A_{16}$: $-9.917 \times 10^{-2}$ In such design requirements, as a result of some wavelength change, any change observed between SA3 being the third-order spherical aberration and SA5 being the fifth-order spherical aberration is derived as shown in FIG. 6. Note that, FIGS. 6, and 7, 8, 9, 10, and 11 each show a change of the third- and fifth-order spherical aberration as a result of any wavelength change in the design requirements in the respective examples that will be described later. In such drawings, $L_{1SA3}$, $L_{2SA3}$, $L_{3SA3}$, $L_{4SA3}$, $L_{5SA3}$, and $L_{6SA3}$ each denote a change of the third-order spherical aberration SA3 as a result of any wavelength change, and $L_{1SA5}$, $L_{2SA5}$, $L_{3SA5}$, $L_{4SA5}$, $L_{5SA5}$, and $L_{6SA5}$ each denote a change of the fifth-order spherical aberration SA5 as a result of any wavelength change. Also in the drawings, the lateral axis denotes the wavelength ($\lambda$), and the vertical axis denotes the amount of aberration (m$\lambda$rms).

In the design requirements above, the third-order spherical aberration on the axis is −0.2 m$\lambda$rms, and the fifth-order spherical aberration is 0.4 m$\lambda$rms, which are both suppressed to be sufficiently small.

The change of third-order spherical aberration with respect to a temperature change $\Delta T$ (° C.), i.e., $\Delta SA3T/\Delta T$, is −0.5 m$\lambda$rms/° C., and the change of third-order spherical aberration with respect to a wavelength change $\Delta \lambda$ (nm), i.e., $\Delta SA3\lambda/\Delta \lambda$, is 7.0 m$\lambda$rms/nm. As such, ($\Delta SA3T/\Delta T$)($\Delta SA3\%/\Delta \lambda$)<0 is thus established so that equation (20) above is satisfied.

Moreover, with C2×C10>0, equation (22) above is satisfied. Therefore, as shown in FIG. 6, when the oscillation wavelength is shifted by 1 nm to the side of a long wavelength from the design wavelength of 405 nm, $\Delta SA3$ being the amount of change of third-order axial spherical aberration to be generated in the objective lens is 7.0 m$\lambda$rms, and $\Delta SA5$ being the amount of change of fifth-order axial spherical aberration is 0.5 m$\lambda$rms. As such, with resulting $\Delta SA3 \times \Delta SA5 > 0$, equation (23) above is satisfied.

As described above, the resulting third-order axial spherical aberration generated as such can be cancelled out by directing converged lights to the objective lens through adjustment of the optical system, e.g., moving a collimator lens. With the objective lens of such design requirements, the third-order spherical aberration to be generated by a change of the scaling factor by 0.01 is −281 m$\lambda$rms, and the fifth-order spherical aberration is −49 m$\lambda$rms. If the scaling factor is so adjusted as to cancel out $\Delta SA3$, the fifth-order axial spherical aberration will be −0.7 m$\lambda$rms, thereby cancelling out the fifth-order spherical aberration at the same time.

As such, when the objective lens of Example 1 configured as such is used for the optical pickup device or others, the tolerance degree of an oscillation wavelength with respect to the design wavelength in a semiconductor laser can be extended, thereby being able to lead to the increase of the yield.

Moreover, with C2/f=−93.76, equation (24) above is satisfied, thereby being able to extend the tolerance degree of a difference of the oscillation wavelength in a semiconductor laser with respect to the design wavelength. The pitch on the rim side of the diffractive structure can be also increased, i.e., the shortest pitch can be increased, thereby being able to lead to the easy manufacturing and extend the tolerance degree.

Further, with f×C2×$\lambda$=−75493>−85000, equation (25) above is satisfied. Accordingly, the deviation of the light-gathering position in the optical axis direction as a result of the shifting of the wavelength of 1 nm is suppressed to be small, i.e., 0.41 nm. Accordingly, a beam spot can be protected from blurring, which often occurs when the semiconductor laser shows some wavelength variation.

EXAMPLE 2

In the objective lens of Example 2, the reference characters f, n, d, and NA are as below.
  f: 1.41 [mm]
  n: 1.525
  d: 1.72 [mm]
  NA: 0.85

The reference characters R, K, and $A_i$ representing the shape of the first surface on the light-entering side of the objective lens of Example 2 are as below. The nth-order coefficient Cn of an optical-path difference determining the length of increase $\phi$ (h) of the optical path by the zone diffractive structure provided to the first surface is as below.
  Shape of First Surface
  R: 1.001 [mm]
  K: −0.586
  $A_4$: $1.252 \times 10^{-2}$
  $A_6$: $-6.335 \times 10^{-3}$
  $A_8$: $8.761 \times 10^{-3}$
  $A_{10}$: $6.432 \times 10^{-4}$
  $A_{12}$: $-3.676 \times 10^{-3}$ $A_{14}$: 1.437×10$^{-3}$
$A_{16}$: -3.370×10$^{-3}$
$A_{18}$: 6.611×10$^{-3}$
$A_{20}$: -3.508×10$^{-3}$
C2: -123.46
C4: -34.87
C6: -17.04
C8: 0.42
C10: -3.00

The reference characters R, K, and $A_i$ representing the shape of the second surface on the light-exiting side of the objective lens of Example 2 are as below.

Shape of Second Surface
R: -1.83 [mm]
K: -71.474
$A_4$: 4.967×10$^{-1}$
$A_6$: -9.077×10$^{-1}$
$A_8$: -3.459×10$^{-1}$
$A_{10}$: 3.453
$A_{12}$: -6.086
$A_{14}$: 5.609
$A_{16}$: -2.408

Figure 7:
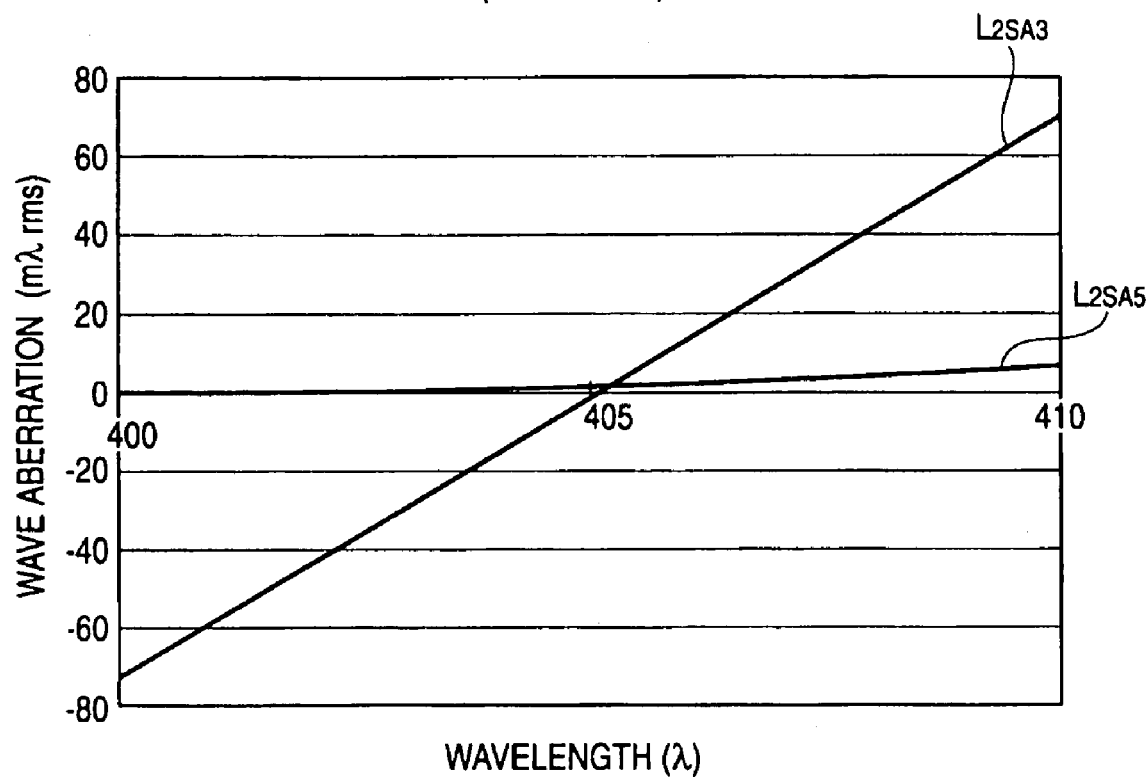
FIG. 7 is a diagram showing the characteristics of aberration caused by a wavelength variation observed in an objective lens of an example 2, i.e., a characteristic diagram showing a change caused by a wavelength variation between the third-order spherical aberration and the fifth-order spherical aberration.

In such design requirements, as a result of some wavelength change, any change observed between SA3 being the third-order spherical aberration and SA5 being the fifth-order spherical aberration is derived as shown in FIG. 7.

In the design requirements above, the third-order spherical aberration on the axis is -0.4 m$\lambda$rms, and the fifth-order spherical aberration is 0.1 m$\lambda$rms, which are both suppressed to be sufficiently small.

The change of third-order spherical aberration with respect to a temperature change $\Delta T$ (° C.), i.e., $\Delta SA3T/\Delta T$, is -1.0 m$\lambda$rms/° C., and the change of third-order spherical aberration with respect to a wavelength change $\Delta\lambda$ (nm), i.e., $\Delta SA3\lambda/\Delta\lambda$, is 14.3 m$\lambda$rms/nm. As such, $(\Delta SA3T/\Delta T) \cdot (\Delta SA3\lambda/\Delta\lambda) < 0$ is thus established so that equation (20) above is satisfied.

Moreover, with C2×C10>0, equation (22) above is satisfied. Therefore, as shown in FIG. 7, when the oscillation wavelength is shifted by 1 nm to the side of a long wavelength from the design wavelength of 405 nm, $\Delta SA3$ being the amount of change of third-order axial spherical aberration to be generated in the objective lens is 14.3 m$\lambda$rms, and $\Delta SA5$ being the amount of change of fifth-order axial spherical aberration is 1.3 m$\lambda$rms. As such, with resulting $\Delta SA3 \times \Delta SA5 > 0$, equation (23) above is satisfied.

As described above, the resulting third-order axial spherical aberration generated as such can be cancelled out by directing converged lights to the objective lens through adjustment of the optical system, e.g., moving a collimator lens. With the objective lens of such design requirements, the third-order spherical aberration to be generated by a change of the scaling factor by 0.01 is -283 m$\lambda$rms, and the fifth-order spherical aberration is -51 m$\lambda$rms. If the scaling factor is so adjusted as to cancel out $\Delta SA3$, the fifth-order axial spherical aberration will be -1.3 m$\lambda$rms, thereby cancelling out the fifth-order spherical aberration at the same time.

As such, when the objective lens of Example 2 configured as such is used for the optical pickup device or others, the tolerance degree of an oscillation wavelength with respect to the design wavelength in a semiconductor laser can be extended, thereby being able to lead to the increase of the yield.

Moreover, with C2/f=-87.56, equation (24) above is satisfied, thereby being able to extend the tolerance degree of a difference of the oscillation wavelength in a semiconductor laser with respect to the design wavelength. The pitch on the rim side of the diffractive structure can be also increased, i.e., the shortest pitch can be increased, thereby being able to lead to the easy manufacturing and extend the tolerance degree.

Further, with f×C2×$\lambda$=-70502>-85000, equation (25) above is satisfied. Accordingly, the deviation of the light-gathering position in the optical axis direction as a result of the shifting of the wavelength of 1 nm is suppressed to be small, i.e., 0.44 nm. Accordingly, a beam spot can be protected from blurring, which often occurs when the semiconductor laser shows some wavelength variation.

EXAMPLE 3

In the objective lens of Example 3, the reference characters f, n, d, and NA are as below.

f: 1.41 [mm]
n: 1.525
d: 1.77 [mm]
NA: 0.85

The reference characters R, K, and $A_i$ representing the shape of the first surface on the light-entering side of the objective lens of Example 3 are as below. The nth-order coefficient Cn of an optical-path difference determining the length of increase $\phi(h)$ of the optical path by the zone diffractive structure provided to the first surface is as below.

Shape of First Surface
R: 0.961 [mm]
K: -0.600
$A_4$: 1.186×10$^2$
$A_6$: -6.683×10$^{-3}$
$A_8$: 6.289×10$^{-3}$
$A_{10}$: -1.245×10$^{-4}$
$A_{12}$: -2.866×10$^{-3}$
$A_{14}$: 1.350×10$^{-3}$
$A_{16}$: -3.694×10$^{-3}$
$A_{18}$: 6.381×10$^{-3}$
$A_{20}$: -3.355×10$^{-3}$
C2: -74.07
C4: -29.32
C6: -17.99
C8: 0.63
C10: -2.84

The reference characters R, K, and $A_i$ representing the shape of the second surface on the light-exiting side of the objective lens of Example 3 are as below.

Shape of Second Surface
R: -1.511 [mm]
K: -49.789
$A_4$: 4.902×10$^{-1}$
$A_6$: -9.251×10$^{-1}$
$A_8$: -2.460×10$^{-1}$
$A_{10}$: 3.498
$A_{12}$: -6.423
$A_{14}$: 5.725
$A_{16}$: -2.210

Figure 8:
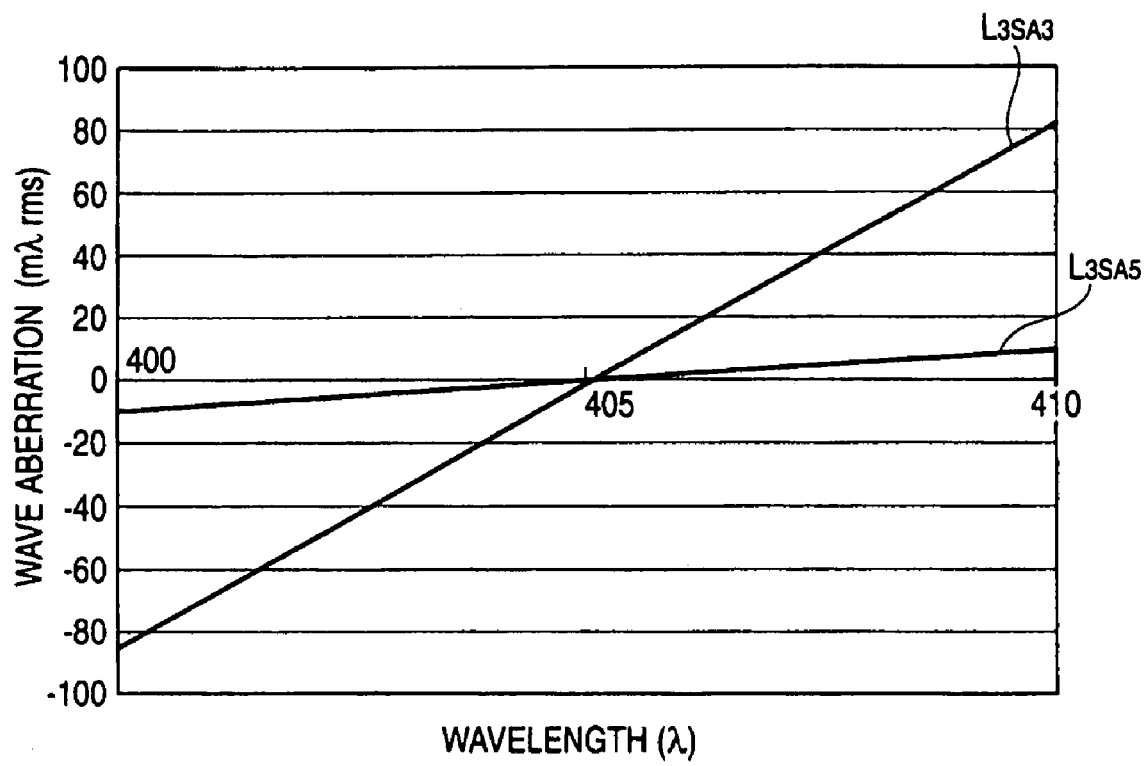
FIG. 8 is a diagram showing the characteristics of aberration caused by a wavelength variation observed in an objective lens of an example 3, i.e., a characteristic diagram showing a change caused by a wavelength variation between the third-order spherical aberration and the fifth-order spherical aberration.

In such design requirements, as a result of some wavelength change, any change observed between SA3 being the third-order spherical aberration and SA5 being the fifth-order spherical aberration is derived as shown in FIG. 8.

In the design requirements above, the third-order spherical aberration on the axis is -0.6 m$\lambda$rms, and the fifth-order spherical aberration is 0.2 m$\lambda$rms, which are both suppressed to be sufficiently small.

The change of third-order spherical aberration with respect to a temperature change $\Delta T$ (° C.), i.e., $\Delta SA3T/\Delta T$, is -1.1 m$\lambda$rms/° C., and the change of third-order spherical aberration with respect to a wavelength change $\Delta\lambda$ (nm), i.e., $\Delta SA3\lambda/\Delta\lambda$, is 16.8 m$\lambda$.rms/nm. As such, ($\Delta SA3T/\Delta T$)·($\Delta SA3\lambda/\Delta\lambda$)<0 is thus established so that equation (20) above is satisfied.

Moreover, with C2×C10>0, equation (22) above is satisfied. Therefore, as shown in FIG. 8, when the oscillation wavelength is shifted by 1 nm to the side of a long wavelength from the design wavelength of 405 nm, $\Delta SA3$ being the amount of change of third-order axial spherical aberration to be generated in the objective lens is 16.8 m$\lambda$.rms, and $\Delta SA5$ being the amount of change of fifth-order axial spherical aberration is 2.1 m$\lambda$.rms. As such, with resulting $\Delta SA3 \times \Delta SA5$>0, equation (23) above is satisfied.

As described above, the resulting third-order axial spherical aberration generated as such can be cancelled out by directing converged lights to the objective lens through adjustment of the optical system, e.g., moving a collimator lens. With the objective lens of such design requirements, the third-order spherical aberration to be generated by a change of the scaling factor by 0.01 is −282 m$\lambda$.rms, and the fifth-order spherical aberration is −49 m$\lambda$.rms. If the scaling factor is so adjusted as to cancel out $\Delta SA3$, the fifth-order axial spherical aberration will be −0.8 m$\lambda$.rms, thereby cancelling out the fifth-order spherical aberration at the same time.

As such, when the objective lens of Example 3 configured as such is used for the optical pickup device, the tolerance degree of an oscillation wavelength with respect to the design wavelength in a semiconductor laser can be extended, thereby being able to lead to the increase of the yield.

Moreover, with C2/f=−52.53, equation (24) above is satisfied, thereby being able to extend the tolerance degree of a difference of the oscillation wavelength in a semiconductor laser with respect to the design wavelength. The pitch on the rim side of the diffractive structure can be also increased, i.e., the shortest pitch can be increased, thereby being able to lead to the easy manufacturing and extend the tolerance degree.

Further, with f×C2×$\lambda$=−42298>−85000, equation (25) above is satisfied. Accordingly, the deviation of the light-gathering position in the optical axis direction as a result of the shifting of the wavelength of 1 nm is suppressed to be small, i.e., 0.24 nm. Accordingly, a beam spot can be protected from blurring, which often occurs when the semiconductor laser shows some wavelength variation.

EXAMPLE 4

In the objective lens of Example 2, the reference characters f, n, d, and NA are as below.
f: 1.41 [mm]
n: 1.525
d: 1.80 [mm]
NA: 0.85

The reference characters R, K, and $A_i$ representing the shape of the first surface on the light-entering side of the objective lens of Example 4 are as below. The nth-order coefficient Cn of an optical-path difference determining the length of increase $\phi$ (h) of the optical path by the zone diffractive structure provided to the first surface is as below.
Shape of First Surface
R: 0.945 [mm]
K: −0.606
$A_4$: 7.192×10$^{-3}$
$A_6$: −9.178×10$^{-3}$
$A_8$: 1.193×10$^{-2}$
$A_{10}$: 8.630×10$^{-4}$
$A_{12}$: −6.377×10$^{-3}$
$A_{14}$: 2.283×10$^{-4}$
$A_{16}$: −3.380×10$^{-3}$
$A_{18}$: 8.208×10$^{-3}$
$A_{20}$: −4.211×10$^{-3}$
C2: −49.38
C4: −36.24
C6: −10.30
C8: 1.94
C10: −4.73

The reference characters R, K, and $A_i$ representing the shape of the second surface on the light-exiting side of the objective lens of Example 4 are as below.
Shape of Second Surface
R: −1.374 [mm]
K: −48.307
$A_4$: 4.206×10$^{-1}$
$A_6$: −6.983×10$^{-1}$
$A_8$: −5.512×10$^{-1}$
$A_{10}$: 3.499
$A_{12}$: −5.781
$A_{14}$: 4.686
$A_{16}$: −1.602

Figure 9:
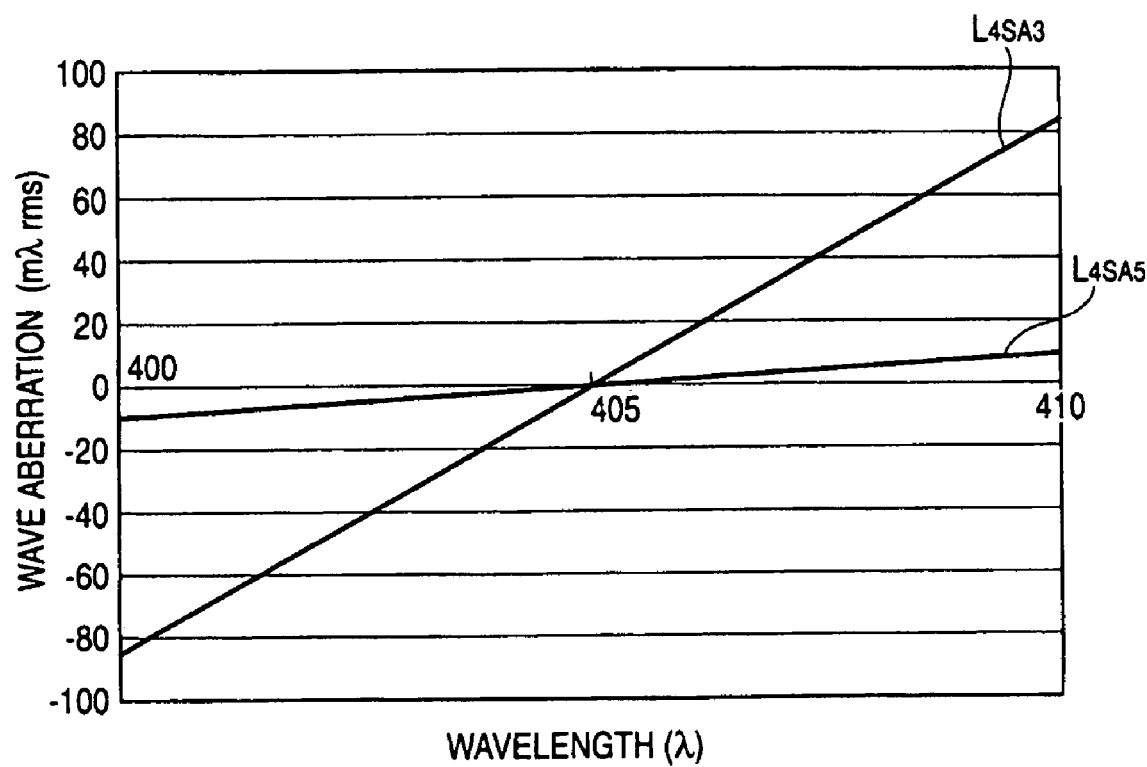
FIG. 9 is a diagram showing the characteristics of aberration caused by a wavelength variation observed in an objective lens of an example 4, i.e., the characteristic diagram showing a change caused by a wavelength variation between the third-order spherical aberration and the fifth-order spherical aberration.

In such design requirements, as a result of some wavelength change, any change observed between SA3 being the third-order spherical aberration and SA5 being the fifth-order spherical aberration is derived as shown in FIG. 9.

In the design requirements above, the third-order spherical aberration on the axis is −0.6 m$\lambda$.rms, and the fifth-order spherical aberration is 0.5 m$\lambda$.rms, which are both suppressed to be sufficiently small.

The change of third-order spherical aberration with respect to a temperature change $\Delta T$ (° C.), i.e., $\Delta SA3T/\Delta T$, is 1.2 m$\lambda$.rms/° C., and the change of third-order spherical aberration with respect to a wavelength change $\Delta\lambda$ (nm), i.e., $\Delta SA3\lambda/\Delta\lambda$, is 17.3 m$\lambda$.rms/nm. As such, ($\Delta SA3T/\Delta T$)·($\Delta SA3\lambda/\Delta\lambda$)<0 is thus established so that equation (20) above is satisfied.

Moreover, with C2×C10>0, equation (22) above is satisfied. Therefore, as shown in FIG. 9, when the oscillation wavelength is shifted by 1 nm to the side of a long wavelength from the design wavelength of 405 nm, $\Delta SA3$ being the amount of change of third-order axial spherical aberration to be generated in the objective lens is 17.3 m$\lambda$.rms, and $\Delta SA5$ being the amount of change of fifth-order axial spherical aberration is 2.4 m$\lambda$.rms. As such, with resulting $\Delta SA3 \times \Delta SA5$>0, equation (23) above is satisfied.

As described above, the resulting third-order axial spherical aberration generated as such can be cancelled out by directing converged lights to the objective lens through adjustment of the optical system, e.g., moving a collimator lens. With the objective lens of such design requirements, the third-order spherical aberration to be generated by a change of the scaling factor by 0.01 is −279 m$\lambda$.rms, and the fifth-order spherical aberration is −47 m$\lambda$.rms. If the scaling factor is so adjusted as to cancel out $\Delta SA3$, the fifth-order axial spherical aberration will be −0.5 m$\lambda$.rms, thereby cancelling out the fifth-order spherical aberration at the same time.

As such, when the objective lens of Example 4 configured as such is used for the optical pickup device or others, the tolerance degree of an oscillation wavelength with respect to the design wavelength in a semiconductor laser can be extended, thereby being able to lead to the increase of the yield.

Moreover, with C2/f=−35.02, equation (24) above is satisfied, thereby being able to extend the tolerance degree of a difference of the oscillation wavelength in a semiconductor laser with respect to the design wavelength. The pitch on the rim side of the diffractive structure can be also increased, i.e., the shortest pitch can be increased, thereby being able to lead to the easy manufacturing and extend the tolerance degree.

Further, with f×C2×=−28199>−85000, equation (25) above is satisfied. Accordingly, the deviation of the light-gathering position in the optical axis direction as a result of the shifting of the wavelength of 1 nm is suppressed to be small, i.e., 0.15 nm. Accordingly, a beam spot can be protected from blurring, which often occurs when the semiconductor laser shows some wavelength variation.

EXAMPLE 5

In the objective lens of Example 5, the reference characters f, n, d, and NA are as below.
 f: 1.41 [mm]
 n: 1.525
 d: 1.83 [mm]
 NA: 0.85

The reference characters R, K, and $A_i$ representing the shape of the first surface on the light-entering side of the objective lens of Example 5 are as below. The nth-order coefficient Cn of an optical-path difference determining the length of increase $\phi$ (h) of the optical path by the zone diffractive structure provided to the first surface is as below.
 Shape of First Surface
 R: 0.925 [mm]
 K: −0.611
 $A_4$: 4.882×10$^{-3}$
 $A_6$: −8.296×10$^{-3}$
 $A_8$: 1.016×10$^{-2}$
 $A_{10}$: 1.271×10$^{-3}$
 $A_{12}$: −6.405×10$^{-3}$
 $A_{14}$: 2.180×10$^{-4}$
 $A_{16}$: −3.322×10$^{-3}$
 $A_{18}$: 8.198×10$^{-3}$
 $A_{20}$: −4.270×10$^{-3}$
 C2: −24.69
 C4: −35.13
 C6: −9.30
 C8: 1.95
 C10: −4.86

The reference characters R, K, and $A_i$ representing the shape of the second surface on the light-exiting side of the objective lens of Example 5 are as below.
 Shape of Second Surface
 R: −1.272 [mm]
 K: −41.900
 $A_4$: 4.165×10$^{-1}$
 $A_6$: −6.884×10$^{-1}$
 $A_8$: −5.324×10$^{-1}$
 $A_{10}$: 3.413
 $A_{12}$: −5.713
 $A_{14}$: 4.757
 $A_{16}$: −1.690

Figure 10:
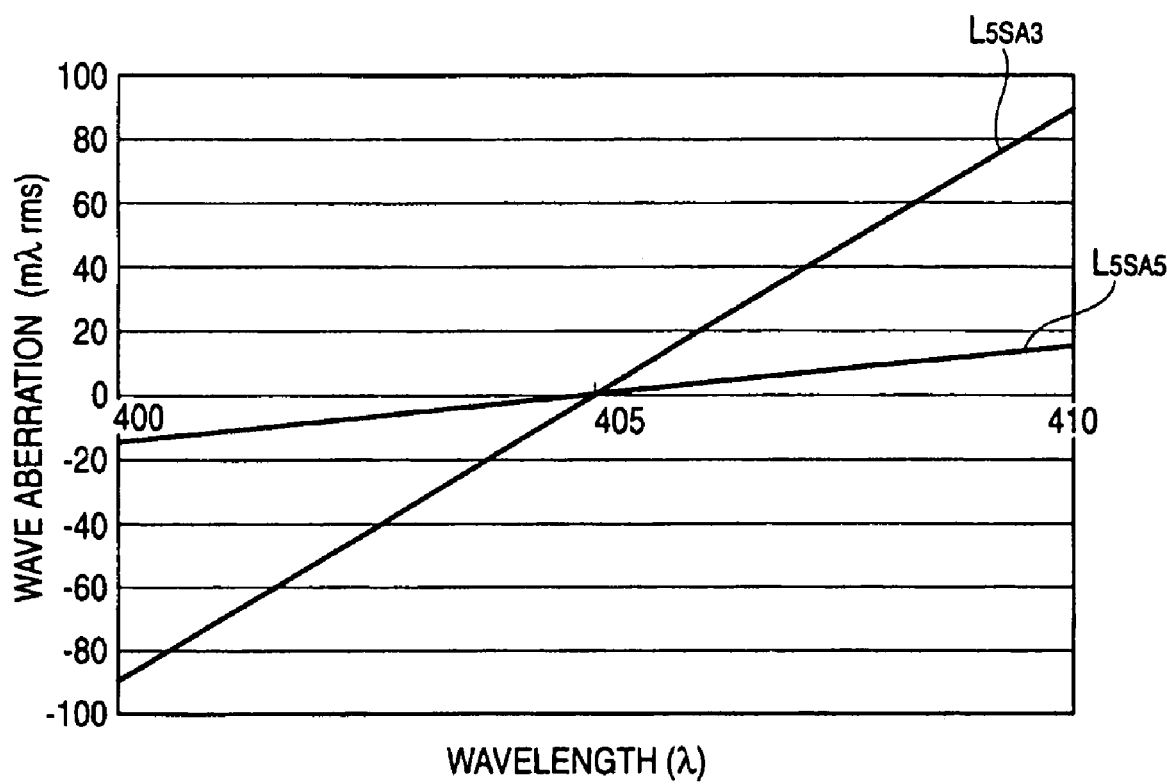
FIG. 10 is a diagram showing the characteristics of aberration caused by a wavelength variation observed in an objective lens of an example 5, i.e., a characteristic diagram showing a change caused by a wavelength variation between the third-order spherical aberration and the fifth-order spherical aberration.

In such design requirements, as a result of some wavelength change, any change observed between SA3 being the third-order spherical aberration and SA5 being the fifth-order spherical aberration is derived as shown in FIG. 10.

In the design requirements above, the third-order spherical aberration on the axis is −0.6 mλrms, and the fifth-order spherical aberration is 0.3 mλrms, which are both suppressed to be sufficiently small.

The change of third-order spherical aberration with respect to a temperature change $\Delta T$ (° C.), i.e., $\Delta SA3T/\Delta T$, is −1.3 mλrms/° C., and the change of third-order spherical aberration with respect to a wavelength change $\Delta\lambda$ (nm), i.e., $\Delta SA3\lambda/\Delta\lambda$, is 18.4 mλrms/nm. As such, $(\Delta SA3T/\Delta T)\cdot(\Delta SA3\lambda/\Delta\lambda)<0$ is thus established so that equation (20) above is satisfied.

Moreover, with C2×C10>0, equation (22) above is satisfied. Therefore, as shown in FIG. 10, when the oscillation wavelength is shifted by 1 nm to the side of a long wavelength from the design wavelength of 405 nm, $\Delta SA3$ being the amount of change of third-order axial spherical aberration to be generated in the objective lens is 18.4 mλrms, and $\Delta SA5$ being the amount of change of fifth-order axial spherical aberration is 2.7 mλrms. As such, with resulting $\Delta SA3\times\Delta SA5>0$, equation (23) above is satisfied.

As described above, the resulting third-order axial spherical aberration generated as such can be cancelled out by directing converged lights to the objective lens through adjustment of the optical system, e.g., moving a collimator lens. With the objective lens of such design requirements, the third-order spherical aberration to be generated by a change of the scaling factor by 0.01 is −279 mλrms, and the fifth-order spherical aberration is −47 mλrms. If the scaling factor is so adjusted as to cancel out $\Delta SA3$, the fifth-order axial spherical aberration will be −0.4 mλrms, thereby cancelling out the fifth-order spherical aberration at the same time.

As such, when the objective lens of Example 5 configured as such is used for the optical pickup device, the tolerance degree of an oscillation wavelength with respect to the design wavelength in a semiconductor laser can be extended, thereby being able to lead to the increase of the yield.

Moreover, with C2/f=−17.51, equation (24) above is satisfied, thereby being able to extend the tolerance degree of a difference of the oscillation wavelength in a semiconductor laser with respect to the design wavelength. The pitch on the rim side of the diffractive structure can be also increased, i.e., the shortest pitch can be increased, thereby being able to lead to the easy manufacturing and extend the tolerance degree.

Further, with f×C2×λ=−14100>−85000, equation (25) above is satisfied. Accordingly, the deviation of the light-gathering position in the optical axis direction as a result of the shifting of the wavelength of 1 nm is suppressed to be small, i.e., 0.06 nm. Accordingly, a beam spot can be protected from blurring, which often occurs when the semiconductor laser shows some wavelength variation.

EXAMPLE 6

In the objective lens of Example 6, the reference characters f, n, d, and NA are as below.
 f: 1.41 [mm]
 n: 1.525
 d: 1.93 [mm]
 NA: 0.85

The reference characters R, K, and $A_i$ representing the shape of the first surface on the light-entering side of the objective lens of Example 6 are as below. The nth-order coefficient Cn of an optical-path difference determining the length of increase $\phi$ (h) of the optical path by the zone diffractive structure provided to the first surface is as below.
 Shape of First Surface
 R: 0.921 [mm]
 K: −0.662
 $A_4$: 1.108×10$^{-2}$
 $A_6$: 2.098×10$^{-2}$
 $A_8$: −2.414×10$^{-2}$
 $A_{10}$: 1.585×10$^{-2}$
 $A_{12}$: −4.195×10$^{-3}$
 $A_{14}$: −3.362×10$^{-3}$
 $A_{16}$: −3.060×10$^{-3}$ $A_{18}$: 8.197×10$^{-3}$
$A_{20}$: −3.879×10$^{-3}$
C2: 17.55
C4: −30.03
C6: 21.63
C8: −28.00
C10: 5.79

The reference characters R, K, and $A_i$ representing the shape of the second surface on the light-exiting side of the objective lens of Example 6 are as below.

Figure 11:
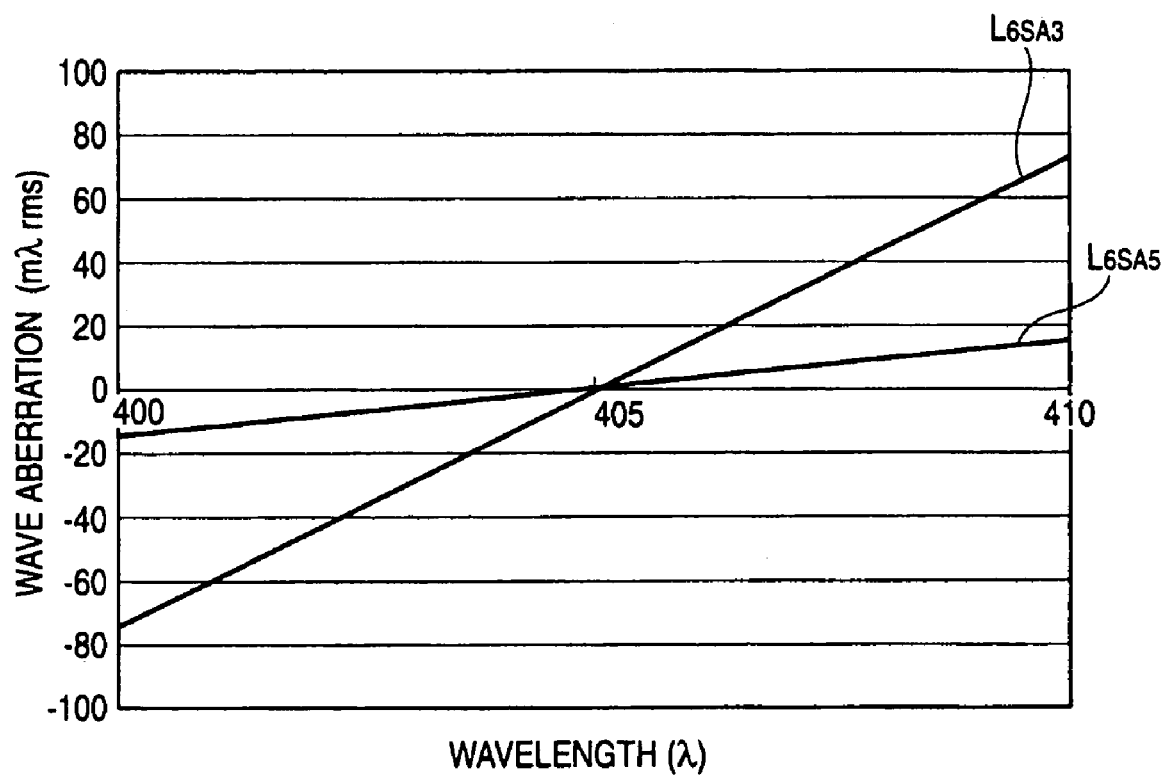
FIG. 11 is a diagram showing the characteristics of aberration caused by a wavelength variation observed in an objective lens of an example 6, i.e., a characteristic diagram showing a change caused by a wavelength variation between the third-order spherical aberration and the fifth-order spherical aberration.

Shape of Second Surface
R: −1.001 [mm]
K: −34.96
$A_4$: 2.375×10$^{-1}$
$A_6$: −2.137×10$^{-1}$
$A_8$: −9.146×10$^{-1}$
$A_{10}$: 2.436
$A_{12}$: −2.653
$A_{14}$: 1.393
$A_{16}$: −2.855×10$^{-1}$ In such design requirements, as a result of some wavelength change, any change observed between SA3 being the third-order spherical aberration and SA5 being the fifth-order spherical aberration is derived as shown in FIG. 11.

In the design requirements above, the third-order spherical aberration on the axis is 0.4 mλrms, and the fifth-order spherical aberration is 0.3 mλrms, which are both suppressed to be sufficiently small.

The change of third-order spherical aberration with respect to a temperature change ΔT (° C.), i.e., ΔSA3T/ΔT, is −0.08 mλrms/° C., and the change of third-order spherical aberration with respect to a wavelength change Δλ (nm), i.e., ΔSA3λ/Δλ, is 14.9 mλrms/nm. As such, (ΔSA3T/ΔT)·(ΔSA3λ/Δλ)<0 is thus established so that equation (20) above is satisfied.

Moreover, with C2×10>0, equation (22) above is satisfied. Therefore, as shown in FIG. 11, when the oscillation wavelength is shifted by 1 nm to the side of a long wavelength from the design wavelength of 405 nm, ΔSA3 being the amount of change of third-order axial spherical aberration to be generated in the objective lens is 14.9 mλrms, and ΔSA5 being the amount of change of fifth-order axial spherical aberration is 2.7 mλrms. As such, with resulting ΔSA3×ΔSA5>0, equation (23) above is satisfied.

As described above, the resulting third-order axial spherical aberration generated as such can be cancelled out by directing converged lights to the objective lens through adjustment of the optical system, e.g., moving a collimator lens. With the objective lens of such design requirements, the third-order spherical aberration to be generated by a change of the scaling factor by 0.01 is −260 mλrms, and the fifth-order spherical aberration is −38 mλrms. If the scaling factor is so adjusted as to cancel out ΔSA3, the fifth-order axial spherical aberration will be 0.5 mλrms, thereby cancelling out the fifth-order spherical aberration at the same time.

As such, when the objective lens of Example 6 configured as such is used for the optical pickup device or others, the tolerance degree of an oscillation wavelength with respect to the design wavelength in a semiconductor laser can be extended, thereby being able to lead to the increase of the yield.

Moreover, with C2/f=12.4, equation (24) above is satisfied, thereby being able to extend the tolerance degree of a difference of the oscillation wavelength in a semiconductor laser with respect to the design wavelength. The pitch on the rim side of the diffractive structure can be also increased, i.e., the shortest pitch can be increased, thereby being able to lead to the easy manufacturing, and the tolerance degree can be extended.

Further, with f×C2×λ=10022>−85000, equation (25) above is satisfied. Accordingly, the deviation of the light-gathering position in the optical axis direction as a result of the shifting of the wavelength of 1 nm is suppressed to be small, i.e., 0.18 nm. Accordingly, a beam spot can be protected from blurring, which often occurs when the semiconductor laser shows some wavelength variation.

As described above, with the objective lens of Examples 1 to 6 and the optical pickup device provided therewith, spherical aberration of not a tolerable level is caused due to a variation of an oscillation wavelength occurred with respect to the design wavelength in a light source, and if an attempt is made to correct the resulting third-order axial spherical aberration through adjustment of an optical system, the fifth-order axial spherical aberration is problematically increased, for example. On the other hand, with the objective lenses of Examples 1 to 6 and the optical pickup device provided therewith, an amount of change of third-order axial spherical aberration caused in the objective lenses due to some wavelength change has a fixed relationship with an amount of change of fifth-order axial spherical aberration. Accordingly, even if the oscillation wavelength in a light source varies and shows a difference from the design wavelength, the resulting third- and fifth-order axial spherical aberration can be cancelled out at the same time through adjustment of an optical system, i.e., aberration as a result of some wavelength variation in a light source can be corrected and reduced. This thus enables to extend the tolerance range of the oscillation wavelength in the light source configuring the optical pickup device, increase the yield of the light source, and reduce the cost.

Moreover, the objective lens of Example 6 and the optical pickup device provided therewith can achieve effects of being able to extend the tolerance range of a variation of the oscillation wavelength observed in a light source. This is because, with equation (23) above satisfied, any aberration as a result of some wavelength change in a light source can be corrected and reduced. Also in view of the wavelength tolerance and the easy processability, the dominant diffracted lights are of any optimum order. Specifically, as described above, the diffractive structure with dominant diffractive lights of fourth- or fifth-order serves satisfactorily in both viewpoints, and this will be described by referring to Example 6 described above.

Specifically, in Example 6, the dominant diffracted lights are of fourth-order. The objective lens of Example 6 and the optical pickup device provided therewith are thus easy to manufacture, and are capable of further extending the tolerance range of a variation of the oscillation wavelength in the light source. This accordingly further increases the yield of the light source, and considerably reduces the cost of the light source and the objective lens.

Described now with more specificity is the fact that the diffracted lights for use in such an objective lens are optimally of fourth- or fifth-order for the diffraction order m as described above. With the lower diffraction order m, the tolerance degree being able to be increased with respect to any wavelength change is as described above, and described now is the possible extension of the tolerance range of manufacturing deviations with the higher diffraction order m with an example of the objective lens of Example 6 by referring to FIGS. 12 to 15.

Figure 12:
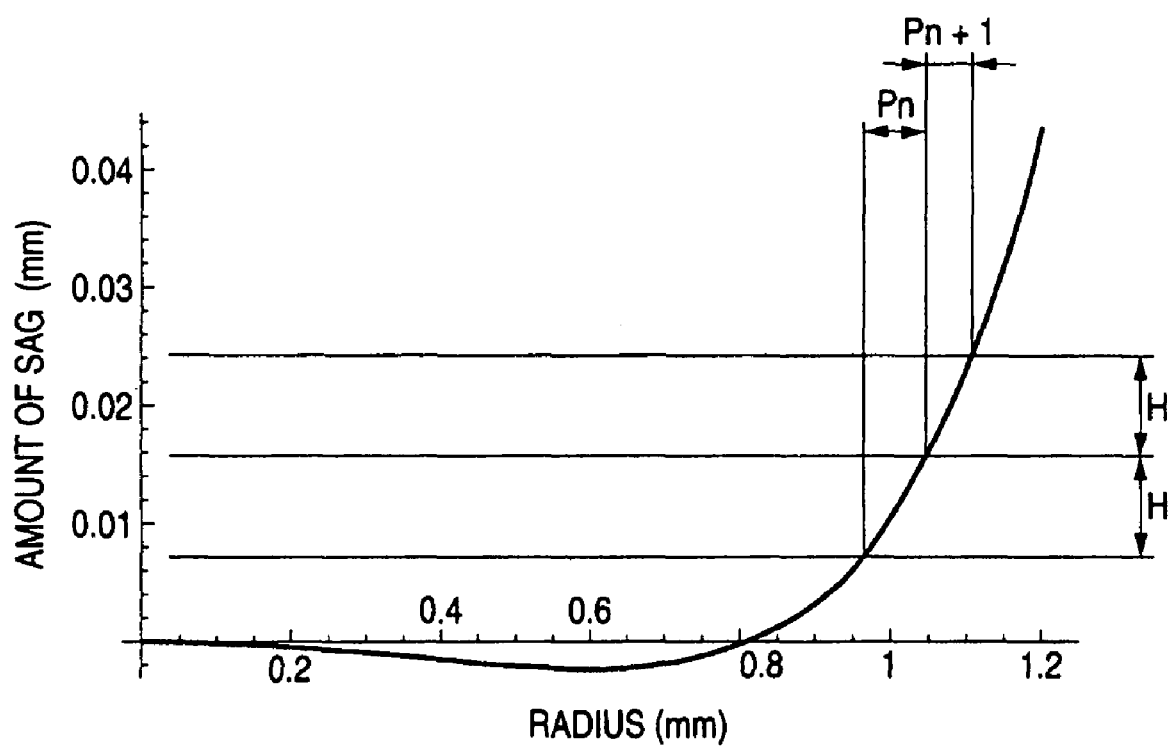
FIG. 12 is a diagram for illustrating any optimum order to be selected for diffraction order showing the maximum diffraction efficiency in the diffractive structure of the objective lens configuring the optical pickup device to which the invention is applied, i.e., a diagram showing an amount of sag at a position in the radius direction in the case of example 6.

FIG. 12 shows an amount of sag at the respective positions in the radial direction in Example 6. That is, in FIG. 12, the lateral axis indicates the position of an objective lens in the radial direction from the center of the optical axis, and the vertical axis indicates an amount of sag at the position. The amount of sag is for defining the amount of trimming needed for the non-spherical component to form the diffractive structure thereto for a comparison use with the diffractive structure to be formed to the objective lens 7. That is, when the amount of sag is a positive (+) value, the objective lens 7 is trimmed by the amount compared with the non-spherical component being a reference, and when the amount of sag is a negative (−) value, the objective lens 7 is put on the amount compared therewith. Specifically, this amount of sag is derived by multiplying, by a constant (1/Δn), the optical-path difference function φ(h) calculated by equation (21) above. Herein, Δn denotes the difference of an index of refraction, and is calculated by the relational expression of Δn=(index of refraction of air)−(index of refraction n of material of objective lens). (Cited reference: Michael A. Golub, "Generalized conversion from the phase function to the blazed surface-relief profile of diffractive optical elements", J. Opt. Soc. Am. A/Vol. 16, No. 5/1194-1201 (1999).

In FIG. 12, a reference character H denotes the height of the diffractive structure, and can be calculated by the relational expression of H=(diffraction order m)×(wavelength λ)/|(difference of index of refraction Δn|. Also in FIG. 12, reference characters Pn and Pn+1 each denote a pitch in the diffractive structure, and as shown in FIG. 12, the pitch is reduced toward the rim portion of the diffractive structure.

Figure 13:
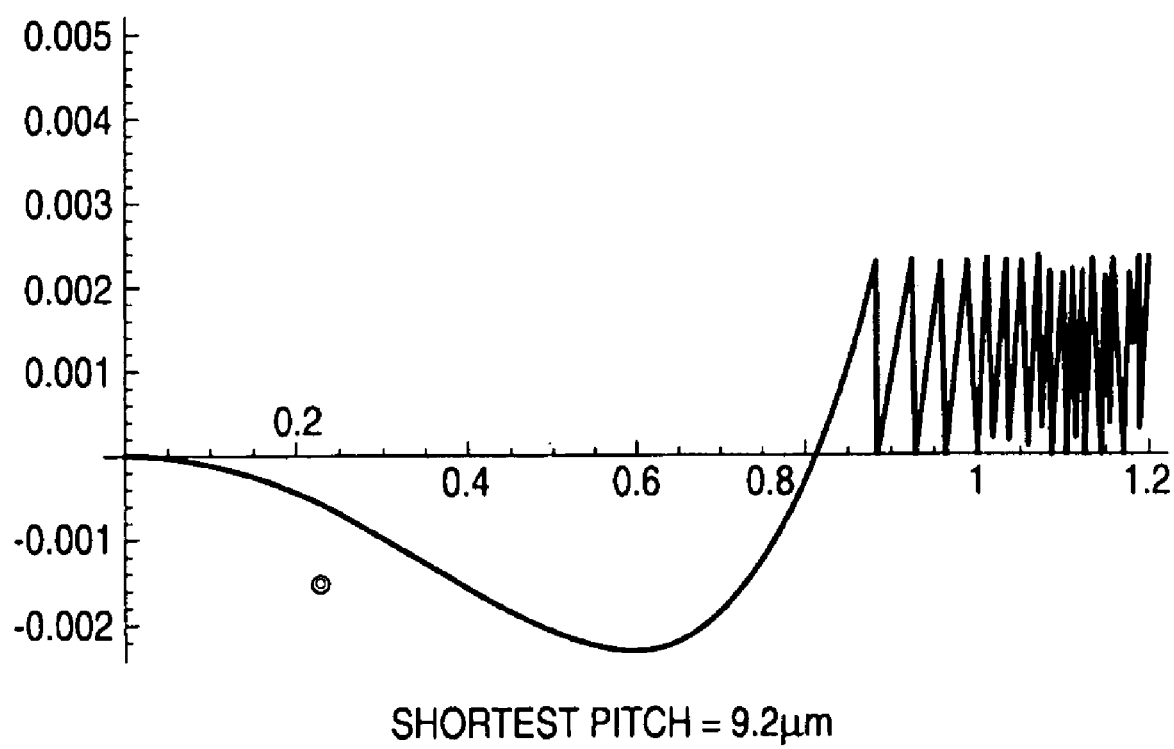
FIG. 13 is a diagram showing the shape of the diffractive structure when the diffraction order is changed based on the amount of sag of FIG. 12, i.e., a diagram showing the shape of the diffractive structure when the diffraction order m is 3.
Figure 14:
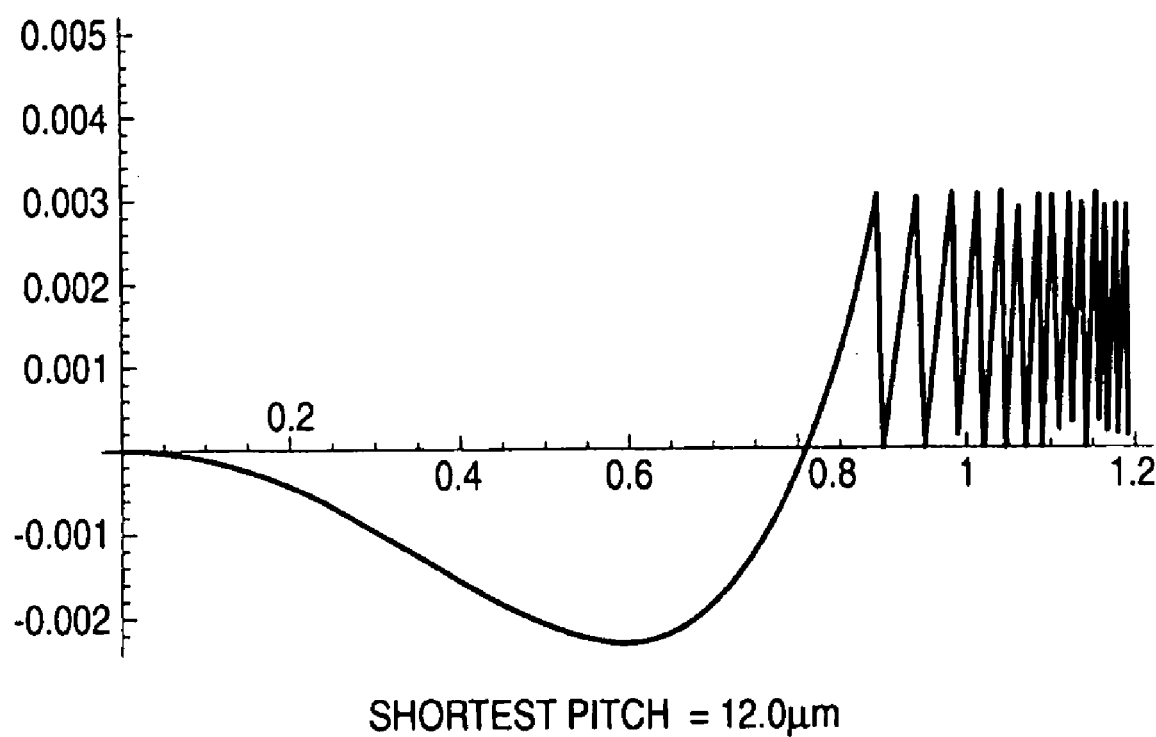
FIG. 14 is another diagram showing the shape of the diffractive structure when the diffraction order is changed based on the amount of sag of FIG. 12, i.e., a diagram showing the shape of the diffractive structure when the diffraction order m is 4.
Figure 15:
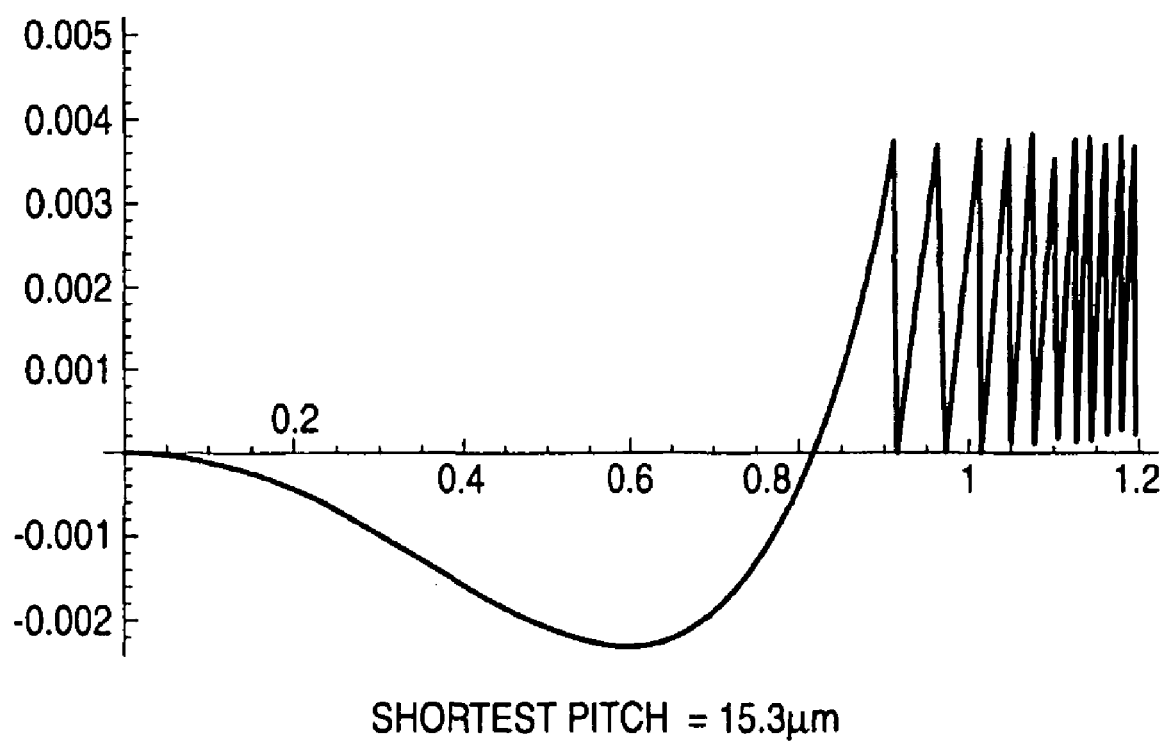
FIG. 15 is still another diagram showing the diffractive structure when the diffraction order is changed based on the amount of sag of FIG. 12, i.e., a diagram showing the shape of the diffractive structure when the diffraction order m is 5.

The amount of sag in FIG. 12 is repeatedly applied to every height H of the diffractive structure, and the result is the actual diffractive structure. FIGS. 13, 14, and 15 respectively show the diffractive structures with the diffraction orders m of 3, 4, and 5. In FIGS. 13 to 15, the lateral axis indicates the position of an objective lens from the center of the optical axis in the radial direction, and the vertical axis indicates the distance of the position from the reference surface. FIG. 13 shows the case with the diffraction order of 3, and therein, the pitch looks narrow on the whole compared with the cases with the diffraction orders of 4 and 5 that will be described later. In this case with the diffraction order of 3, the shortest pitch is 9.2 μm. FIG. 14 shows the case with the diffraction order of 4, and therein, the pitch looks wider on the whole compared with the case with the diffractive order of 3. In this case with the diffraction order of 4, the shortest pitch is 12.0 μm, and it means easier manufacturing compared with the lens of the third-order. FIG. 15 shows the case with the diffraction order of 5, and therein, the pitch looks wider on the whole compared with the cases with the diffraction order of 3 and 4. In this case with the diffraction order of 5, the shortest pitch is 15.3 μm, and it means easier manufacturing compared with the diffraction order of the third- and fourth-order.

As shown in FIGS. 13 to 15 above, with the higher diffraction order m, the shortest pitch is increased for the diffractive structure to be formed. In other words, the tolerance range of the manufacturing deviations can be extended for making full use of the capabilities of the diffractive structure, and the manufacturing process becomes easy. In view of such facts together with the above-described fact of being able to extend the tolerance degree of a wavelength change with the lower diffraction order m, the diffraction orders of 4 and 5 are considered optimum to be dominant in an objective lens configuring the optical pickup device to which the invention is applied.

As such, the objective lenses of Examples 1 to 6 and the optical pickup device provided therewith can be manufactured with ease with diffracted lights being dominant therein are of any optimum diffraction order, and the tolerance range of a variation of the oscillation wavelength can be extended to the maximum extent in a light source.

Further, the objective lenses of Examples 1 to 6 are all so configured as to satisfy equation (24) above so that equation (23) can be easily satisfied. Moreover, with the objective lenses of Examples 1 to 6 and the optical pickup device provided therewith, the shortest pitch of the diffractive structure can be increased by increasing the pitch on the rim side thereof, and the diffractive structure can be easy to process. What is more, the manufacturing deviations can be extended for making full use of the capabilities of the diffractive structure, thereby implementing the easy manufacturing, and extending the tolerance range of a variation of the oscillation wavelength to the maximum extent in a light source.

Moreover, because the objective lenses of Examples 1 to 6 are all so configured as to satisfy equation (25) above, with such objective lenses of Examples 1 to 6 and the optical pickup device provided therewith, the distance L12 can be 0.5 μm or smaller in the optical axis direction between light-gathering positions before and after a wavelength change of 1 nm in light beams. As such, even if the light beams coming from the light source section 3 show some change in wavelength, a beam spot can be protected from blurring, i.e., any possible chromatic aberration can be sufficiently reduced.

As such, the optical pickup device 1 and the optical disk device provided therewith are those for information recording and/or reproduction with respect to a high-density-recording optical disk with an objective lens of a high numerical aperture and for a short wavelength. The optical pickup device 1 is so configured as to include the light source section 3, the objective lens 7, and the collimator lens 6. That is, the light source section 3 emits light beams of a predetermined design wavelength of about 405 nm. The objective lens 7 is a plastic lens provided with, on at least one surface, diffraction means of a zone diffractive structure suppressing generation of aberration caused by a temperature change, and has a numerical aperture of 0.82 or larger for gathering the light beams emitted from the light source section 3 with respect to the optical disk. The collimator lens 6 is disposed between the light source section 3 and the objective lens 7, and derives substantially-collimated lights by converting an angle of divergence of the light beams emitted from the light source section 3. The objective lens is formed to satisfy equation (20) above, where ΔSA3T is an amount of change of third-order spherical aberration to be generated in the objective lens 7 in response to a temperature change in the predetermined range described above, and ΔSA3λ is an amount of change of third-order spherical aberration to be generated in the objective lens 7 in response to a wavelength change within the predetermined range described above observed in the light beams emitted from the light source section 3. Equation (22) is satisfied when a length of an optical path increased by the diffractive structure of the diffraction means is represented by an optical-path difference function φ(h) calculated by equation (21). Equation (23) is also satisfied, where ΔSA3 is an amount of change of third-order axial spherical aberration caused in the objective lens in response to the wavelength change, and ΔSA5 is an amount of change of fifth-order axial spherical aberration. With the objective lens configured as such, even if the oscillation wavelength in the light source section 3 varies due to the manufacturing deviations or others and shows a difference from the design wavelength, the resulting spherical aberration caused by such a difference of the oscillation wavelength from the design wavelength can be corrected and reduced through adjustment of an optical system, e.g., moving the collimator lens 6. That is, the tolerance range can be extended for the oscillation wavelength in the light source such as a semiconductor laser in the light source section while satisfactory recording and reproduction characteristics being retained, thereby realizing the increase of the yield of the semiconductor laser and the reduction of the cost for manufacturing the optical pickup device.

Note that such an optical pickup device 1 is so configured as to include the objective lens 7 of satisfying equations (20) to (23) above, thereby favorably being able to increase the tolerance range of a variation of the oscillation wavelength in the light source at the time of information recording and reproduction to/from a high-density-recording optical disk, and to sufficiently reduce any aberration. This is surely not restrictive, and the optical pickup device 1 may be configured to include an objective lens 17 that will be described later.

Described next is another embodiment of the invention, i.e., an optical pickup device 11 provided with the objective lens 17, and an optical disk device provided with the objective lens 17. In the below, any components similar to those in the optical pickup device 1 described above are provided with the same reference numerals, and not described twice.

The optical pickup device 11 to which the invention is applied is for performing recording and reproduction of information with respect to the optical disk 8 serving as an optical recording medium. The optical pickup device 11 configures an optical disk device together with a spindle motor and a feed motor. The spindle motor serves as drive means for rotating the optical disk 8 for operation, and the feed motor serves to move the optical pickup device 11 in the diameter direction of the optical disk. The optical pickup device 11 performs recording and reproduction of information with respect to the optical disk 8 being rotated and operated by the spindle motor.

Figure 16:
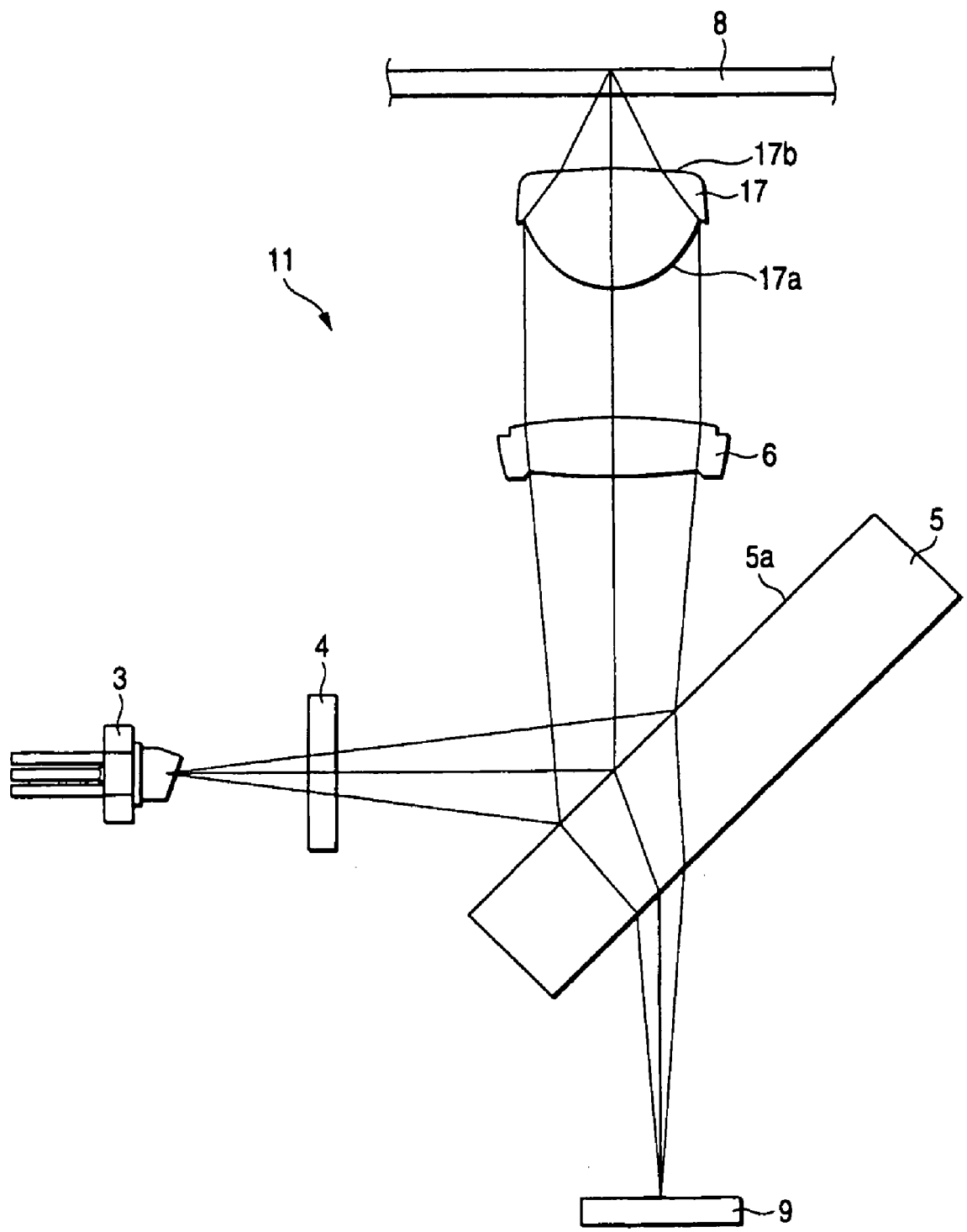
FIG. 16 is a ray diagram showing an optical system in another embodiment of the optical pickup device to which the invention is applied.

As shown in FIG. 16, the optical pickup device 11 to which invention is applied is configured to include the light source section 3, the diffractive optical element 4, the beam splitter 5, the collimator lens 6, the objective lens 17, and the light detector 9. The light source section 3 emits light beams of a wavelength of about 405 nm, and the diffractive optical element 4 splits, into three, the light beams coming from the light source section 3. The beam splitter 5 reflects or passes through the light beams being the splitting results by the diffractive optical element 4, and the reflected lights coming from the optical disk 8. The objective lens 17 gathers the light beams coming from the light source section 3 onto the signal recording surface of the optical disk 8. The light detector 9 detects the returning light beams being the reflection results on the optical disk 8.

The objective lens 17 gathers light beams on the signal recording surface of the optical disk 8. The light beams here are those substantially collimated by the collimator lens 6. On the side of the objective lens 17 from which lights come, an aperture stop (not shown) is provided. This aperture stop is in charge of aperture control, i.e., apply control to derive any desired numerical aperture for light beams entering the objective lens 17.

This objective lens 17 is aplastic-made single objective lens with a numerical aperture (NA) of 0.82 or larger, and both surfaces thereof, i.e., a first surface 17a on the light-entering side and a second surface 17b on the light-exiting side, are non-spherical. The objective lens 17 is provided with, on at least one of the surfaces as a piece, diffraction means of a diffractive structure, i.e., diffractive lens structure. The diffraction means is of the structure with very small height differences in zone for suppressing any aberration resulted from any temperature change. The objective lens 17 gathers incoming light beams onto the optical disk 8. The light beams are those originally from the light source section 3, reflected by the beam splitter 5, and directed to the objective lens 17 via the collimator lens 6. As such, the diffraction means of the objective lens 17 functions as if compensating the generated aberration resulted from some temperature change, i.e., the generated aberration resulted from some change observed in the lens in terms of shape and index of refraction caused by the temperature change, thereby preventing generation of spherical aberration resulted from any temperature change typical of plastic lenses.

As to the objective lens 17, the both surfaces are each in any predetermined non-spherical shape so as to satisfy equation (27) below, where $\Delta SA3T$ is an amount of change of third-order axial spherical aberration observed in the objective lens 17 if with a temperature change by an arbitrary amount of change $\Delta T$ (° C.) in a range from −10° C. to 75° C., and $\Delta SA3\lambda$ is an amount of change of third-order axial spherical aberration observed in the objective lens 17 if with a wavelength change by an arbitrary amount of change $\Delta\lambda$ (nm) in a range of ±5 nm with respect to the wavelength of light beams coming from the light source section 3, i.e., predetermined wavelength of about 405 nm. Hereinafter, $\Delta SA3T$ is also referred to as "amount of change of third-order axial spherical aberration observed in the objective lens 17 in response to a temperature change $\Delta T$ (° C.)", and $\Delta SA3\lambda$ is also referred to as "amount of change of third-order axial spherical aberration observed in the objective lens 17 in response to a wavelength change $\Delta\lambda$ (nm)". The objective lens 17 is provided with predetermined diffraction means on at least one of the surfaces.

$$(\Delta SA3T/\Delta T)\times(\Delta SA3\lambda/\Delta\lambda)<0 \quad (27)$$

The diffractive lens structure is so formed as to satisfy equation (29) below when a length of an optical path increased by the diffractive structure of the diffraction means in the objective lens 17 is represented by an optical-path difference function φ(h) calculated by equation (28) below, where h (mm) is a height from an optical axis, Cn is an nth-order coefficient of an optical-path difference, and λ (nm) is a wavelength of an incoming light beam.

$$\phi(h)=(C2\times h^2+C4\times h^4+C6\times h^6+C8\times h^8+C10\times h^{10}+\ldots)\times\lambda/10^6 \text{ (mm)} \quad (28)$$

$$C4\times C10>0 \quad (29)$$

The objective lens 17 is also so formed as to satisfy equation (30) below, where $\Delta SA3$ and $\Delta SA5$ are of the same sign, i.e., $\Delta SA3$ is an amount of change of third-order axial spherical aberration generated in the objective lens in response to a wavelength change by an amount of change $\Delta\lambda$ (nm), and $\Delta SA5$ is an amount of change of fifth-order axial spherical aberration.

$$\Delta SA3\times\Delta SA5>0 \quad (30)$$

Note here that the objective lens 17 is so configured as to sufficiently suppress the third-order axial spherical aberration and the fifth-order axial spherical aberration even with respect to light beams of an oscillation wavelength showing no difference from the design wavelength.

As such, the objective lens 17 is configured to satisfy any fixed relationship, i.e., equation (30), between $\Delta SA3$ (an amount of change of third-order axial spherical aberration) and $\Delta SA5$ (an amount of change of fifth-order axial spherical aberration), which are to be generated in the objective lens 17 by some wavelength change observed in light beams coming from the light source section 3, i.e., by a difference between an oscillation wavelength and a design wavelength due to a variation of the oscillation wavelength caused by manufacturing deviations or others of the light source section 3. Such a configuration of the optical lens 17 enables to correct and reduce any spherical aberration resulted from such a wavelength change by adjusting an angle of divergence of lights entering the objective lens 17. The angle of divergence here includes an angle of convergence, and such angle adjustment is made by adjusting an optical system, e.g., moving the collimator lens 6. That is, in a previous device for recording and/or reproduction of information with respect to a so-called high-density-recording optical disk with a numerical aperture of 0.82 or larger and the wavelength in use is of about 405 nm, an objective lens causes spherical aberration of a level not permissible due to a variation occurred to the oscillation wavelength in a light source. There thus has been required to strictly control the light source in terms of tolerance value of manufacturing deviations. On the other hand, with the objective lens 17, even when any wavelength change is observed in light beams coming from a light source, any spherical aberration can be corrected and reduced by adjusting an optical system so that the tolerance range of a difference, from the design wavelength, of the oscillation wavelength in the light source can be extended. As such, when the objective lens 17 is used for an optical pickup device and an optical disk device that perform recording and/or reproduction of information with respect to a so-called high-density-recording optical disk, the tolerance range can be extended for the oscillation wavelength in a light source, i.e., the tolerance range of manufacturing deviations can be increased for a light source, and the aberration can be sufficiently reduced. Moreover, the yield of the light source can be increased, thereby enabling the reduction of the cost for the light source and the entire device.

Described now in more detail are the above-described effects of the optical pickup device 11 to which the invention is applied and the objective lens 17 configuring the optical pickup device 11, i.e., the effects of extending the tolerance range of an oscillation range in a light source.

With an optical pickup device for use with a so-called high-density-recording optical disk with the numerical aperture of 0.82 or larger and the wavelength in use of about 405 nm, if the oscillation wavelength of a semiconductor laser or others shows a difference from the design wavelength, the spherical aberration to be generated in an objective lens cannot be of a tolerable level. As such, considered is a method of cancelling out the spherical aberration through adjustment of an angle of divergence of light beams entering the objective lens by moving the collimator lens or others.

When light beams whose oscillation wavelength is with a difference of $\Delta\lambda$ (nm) from the design wavelength are directed into an object lens formed based on the design wavelength, adjusting an angle of divergence of the light beams entering the objective lens can cancel out $\Delta SA3$ being the amount of change of third-order axial spherical aberration generated in the objective lens, and at the same time, suppress $\Delta SA5$ being the amount of change of fifth-order axial spherical aberration as long as equation of $\Delta SA3 \times \Delta SA5 > 0$ is satisfied. This is because when the light beams entering the objective lens are changed in angle of divergence, the resulting third-order spherical aberration and fifth-order spherical aberration are of the same sign.

Moreover, the objective lens 17 of the diffractive structure is desirably formed to satisfy equation (29), where C4 and C10 are respectively a fourth-order coefficient and a tenth-order coefficient of an optical path difference when equation (27) above is satisfied, and when the length of an optical path increased by the diffractive structure is $\phi$ (h) represented by equation (28). In equation (27), $\Delta SA3T$ is an amount of change of third-order axial spherical aberration to be generated in the objective lens 17 in response to a temperature change $\Delta T$ (° C.), and $\Delta SA3\lambda$ is an amount of change to be generated in the objective lens 17 in response to a wavelength change $\Delta\lambda$ (nm).

With equation (30) satisfied by equations (27) to (29) being satisfied as such, when the light beams whose oscillation wavelength is with a difference of $\Delta\lambda$ (nm) from the design wavelength are directed to the objective lens 17, the resulting $\Delta SA3$ being the third-order axial spherical aberration and $\Delta SA5$ being the fifth-order axial spherical aberration generated in the objective lens are of the same sign. This accordingly enables to suppress both $\Delta SA3$ and $\Delta SA5$ by adjusting the angle of divergence of the light beams entering the objective lens 17. On the other hand, with equation (30) not satisfied between $\Delta SA3$ being the third-order axial spherical aberration and $\Delta SA5$ being the fifth-order axial spherical aberration because equations (27) to (29) are not satisfied, even if the light beams entering the objective lens are adjusted in angle of divergence for correcting the third-order axial spherical aberration, the absolute value of the fifth-order axial spherical aberration is increased, thereby not being able to sufficiently suppress the aberration.

As such, in an objective lens with a high numerical aperture and for use with a short wavelength, as with the objective lens 17 configuring the optical pickup device 11 to which the invention is applied, the amounts of change to be generated when the oscillation wavelength shows a difference from the design wavelength are made to be of the same sign, i.e., the amount of change of third-order axial spherical aberration and the amount of change of fifth-order axial spherical aberration. This accordingly enables to correct the spherical aberration through adjustment of an optical system so that the tolerance range of the oscillation wavelength can be extended in a semiconductor laser. This also enables to increase the yield of the semiconductor laser, thereby being able to reduce the cost for manufacturing the whole optical pickup device.

For such an objective lens configuring the optical pickup device, the material of plastic has been considered preferable in view of moldability and low cost, but the plastic lens has disadvantages of spherical aberration to be caused by any temperature change. However, the objective lens 17 of the above configuration is capable of solving such disadvantages with the above-described diffractive structure thereof. The objective lens 17 of such an aberration-preventing diffractive structure also solves the problem of spherical aberration to be generated when light beams entering thereinto are changed in wavelength.

That is, the objective lens 17 is configured not only to be able to correct any aberration resulted from some temperature change but also to be able to suppress, to the limit, the aberration resulted from some wavelength change by adjusting the incoming light beams in angle of divergence or convergence by moving the collimator lens 6.

The objective lens 17 is also so formed that equation (31) below is satisfied by the relationship among the focal length f (mm) thereof, the second-order coefficient C2 of the optical-path difference described above, and the wavelength $\lambda$ (nm) of incoming light beams.

$$f \times C2 \times \lambda > -85000 \tag{31}$$

As shown in FIG. 2, as is formed to satisfy equation (31) above, the objective lens 17 is so formed as to have the distance L12 of 0.5 µm or smaller between light-gathering positions P1 and P2 in an optical axis direction when light beams coming from the light source section 3 have an arbitrary wavelength $\lambda$ (nm) in a range from 400 nm to 410 nm. At the light-gathering position P1, the light beams coming from the light source section 3 are gathered by the objective lens 17, and at the light-gathering position P2, the light beams coming from the light source 3 are gathered thereby when the light beams show a wavelength change of only 1 nm to the side of a long wavelength with respect to the arbitrary wavelength of λ (nm). Note that, in FIG. 2, a reference character B1 denotes the light beams of the wavelength λ (nm), and a reference character B2 denotes the light beams of the wavelength λ+1 (nm).

That is, when an optical distance in the optical axis direction from any arbitrary reference position to the light-gathering position P1 is L1, and when an optical distance in the optical axis direction from the reference position to the light-gathering position P2 is L2, the absolute value of the difference of a distance between the light-gathering positions L1 and L2 (L1−L2), i.e., (|L1−L2|), will be 0.5 µm or smaller. The reference position here may be the vertex of the surface of the objective lens 17 on the optical disk side. Note that exemplified here is the relationship between the arbitrary wavelength λ (nm) and the wavelength λ+1 (nm), which is the one shifting the wavelength λ to the side of a long wavelength by 1 nm. This relationship is about the relative distances of the two light-gathering positions as described above, and therefore, as long as with the objective lens satisfying such a relationship, the distance of 0.5 µm or smaller in the optical axis direction can be derived between two light-gathering positions, i.e., a light-gathering position of gathering light beams of any arbitrary wavelength λ (nm) in a range from 400 nm to 410 nm, and a light-gathering position of gathering light beams of a wavelength λ−1 (nm), which is the one shifting the wavelength λ to the side of the short wavelength by 1 nm.

As such, the objective lens 7 is so formed as to have a distance of 0.5 µm or smaller for the distance L12 between the light-gathering position P1 of gathering the light beams thereby and the light-gathering position P2 of gathering the light beams coming from the light source section 3 thereby when a wavelength change of 1 nm is observed in the light beams with respect to the arbitrary wavelength λ (nm). As such, even if the light beams coming from the light source section 3 shows some change in wavelength, a beam spot can be protected from blurring, i.e., any possible chromatic aberration can be sufficiently reduced.

Based on a focus servo signal and a tracking servo signal generated by returning lights detected by the light detector 9, the optical pickup device 11 configured as such drives the objective lens 17 for focus servo and tracking servo. As is driven by the optical pickup device 11, the objective lens 17 is moved to a focus position where the focus is set on the signal recording surface of the optical disk 8. With the objective lens 17 moved as such, the light beams come into focus on the recording surface of the optical disk 8 so that information recording or reproduction is performed to/from the optical disk 8.

With the provision of such an objective lens 17, the optical pickup device 11 and the optical disk device to which the invention is applied are so configured as to, even with any wavelength change observed in light beams coming from the light source section 3, satisfy a fixed relationship, i.e., equation (30), between ΔSA3 being an amount of change of third-order axial spherical aberration to be generated in the objective lens 17 in response to the wavelength change and ΔSA5 being an amount of change of fifth-order axial spherical aberration. This accordingly enables to correct and reduce any spherical aberration resulted from the wavelength change by adjusting the optical system, i.e., enables to increase the tolerance range of the manufacturing deviations for the light source section 3, and realize the increase of the yield and the reduction of the cost.

That is, even when the oscillation wavelength in the light source section 3 shows a difference from the design wavelength due to a variation occurred to the oscillation wavelength due to the manufacturing deviations of a semiconductor laser or others, in the optical pickup device 11 and the optical disk device to which the invention is applied, any spherical aberration resulted from such a difference of the oscillation wavelength from the design wavelength can be corrected and reduced by moving the collimator lens 6 or others. That is, the tolerance range can be extended for the manufacturing deviations in the light source section, thereby realizing the increase of yield and the reduction of cost. In an exemplary case where the invention is applied to an optical pickup device and an optical disk device that perform recording and/or reproduction with respect to an optical disk including a plurality of recording layers, moving the collimator lens gathers light beams onto all of the recording layers while suppressing generation of aberration, for example. In such a case, if an objective lens configured as above is additionally provided, any possible spherical aberration can be suppressed among a plurality of recording layers so that the aberration can be suppressed to a further degree. Accordingly, the tolerance range can be extended for the manufacturing deviations in the light source section, thereby being able to realize the increase of yield and the reduction of cost.

The optical pickup device 11 and the optical disk device to which the invention is applied serve effective especially when an objective lens in use is with a high numerical aperture (NA) of 0.82 or larger and is for a short wavelength of about 405 nm. Accordingly, even when some wavelength change is observed in light beams coming from the light source section 3, any possible spherical aberration resulted from the wavelength change can be corrected and reduced by adjusting the optical system, i.e., the tolerance range can be increased for the manufacturing deviations in the light source section 3, thereby realizing the increase of yield and the reduction of cost.

Moreover, the optical pickup device 11 and the optical disk device to which the invention is applied are so configured as to satisfy equation (31) above when the focal length of the objective lens is f (mm). This enables to derive the distance L12 of 0.5 µm or smaller in the optical axis direction between light-gathering positions before and after a wavelength change of 1 nm in light beams. As such, even if the light beams coming from the light source section 3 shows some change in wavelength, a beam spot can be protected from blurring, i.e., any possible chromatic aberration can be sufficiently reduced.

Described below with specific numerical values are examples of 1 to 5 and 7 of an objective lens configuring the optical pickup device to which the invention is applied. Prior to describing Examples 1 to 5 and 7, described first is a comparative example for comparison use with the invention. Note that the specific numerical values in Examples 1 to 5 and 7 and the comparative example are as described above, and are thus not described twice.

In the comparative example and Examples 1 to 5 and 7 below, in the objective lens 17, a first surface 17a is located on the side of a light source, and a second surface 17b is located on the side of an optical disk. The design wavelength is 405 nm. A reference character f denotes the focal length (mm) of the objective lens, a reference character R denotes the radius of curvature (mm) of the objective lens, a reference character d denotes the thickness (mm) of the objective lens at the optical axis position, a reference character n denotes the index of refraction with the wavelength (405 nm) of the objective lens, and a reference character NA denotes the numerical aperture of the objective lens when light beams are gathered onto the optical disk. Moreover, a reference character t denotes the thickness (μm) of the optical disk, and a reference character nt denotes the index of refraction with the design wavelength (405 nm) of the optical disk. In the comparative example and Examples 1 to 5 and 7, t=87.5 (μm), and nt=1.6.

The first and second surfaces 17a and 17b of the objective lens 17 are shaped non-spherical, and the non-spherical shape is provided by equation (32) below. Note that, in equation (32), a reference character h denotes the distance (mm) from the optical axis, a reference character Z (h) denotes the distance (mm) from the tangent plane of the surface vertex of the non-spherical surface at the position with the distance h from the optical axis, a reference character K denotes the conical constant, and a reference $A_i$ denotes the non-spherical surface coefficient of ith-order.

$$Z(h) = \frac{h^2/R}{1 + \sqrt{1-(1+K)h^2/R^2}} + \sum_{i=2} A_i h^i \qquad (32)$$

Moreover, presumably, the length of an optical path increased by the diffractive structure formed to at least one surface of the objective lens 17 is provided by φ (h) of equation (28) above including h, Cn, and λ. Note that, in each of Examples 1 to 5 and 7 below, exemplified is a case where the diffractive structure is provided as a piece to the first surface 17a. This is surely not restrictive, and providing the diffractive structure to the second surface 17b as above can also lead to the similar effects.

COMPARATIVE EXAMPLE

In the objective lens of the comparative example, the reference characters are as described above, i.e., f, n, d, and NA, R, K, and $A_i$ indicating the shape of the first surface on the light-entering side, Cn indicating the nth-order coefficient of an optical path difference determining the length increase φ (h) for the optical path of the zone diffractive configuration provided to the first surface, and R, K, and $A_i$ indicating the shape of the second surface on the light-exiting side.

In such an objective lens of the comparative example, as described above, as a result of some wavelength change, any change observed between SA3 being the third-order spherical aberration and SA5 being the fifth-order spherical aberration is derived as shown in FIG. 5. In such an objective lens of the comparative example, the third-order axial spherical aberration in the design requirements is −0.9 mλrms, and the fifth-order spherical aberration is 0.5 mλrms, which are both suppressed to be sufficiently small. The change of third-order spherical aberration with respect to a temperature change ΔT (° C.), i.e., ΔSA3T/ΔT, is −0.5 mλrms/° C., and the change of third-order spherical aberration with respect to a wavelength change Δλ (nm), i.e., ΔSA3λ/Δλ, is 8.9 mλrms/nm. As such, (ΔSA3T/ΔT)·(ΔSA3λ/Δλ)<0 is thus established so that equation (27) above is satisfied.

However, with C4×C10<0, equation (29) above is not satisfied. Therefore, as shown in FIG. 5, when the oscillation wavelength is shifted by 1 nm to the side of a long wavelength from the design wavelength of 405 nm, ΔSA3 being the amount of change of third-order axial spherical aberration to be generated in the objective lens is 8.9 mλrms, and ΔSA5 being the amount of change of fifth-order axial spherical aberration is −3.4 mλrms. As such, with resulting ΔSA3×ΔSA5<0, equation (30) above is not satisfied.

As described above, the resulting third-order axial spherical aberration generated as such can be cancelled out by directing converged lights to the objective lens through adjustment of the optical system, e.g., moving a collimator lens. With the objective lens of such design requirements, the third-order spherical aberration to be generated by a change of the scaling factor by 0.01 is −285 mλrms, and the fifth-order spherical aberration is −51 mλrms. If the scaling factor is so adjusted as to cancel out ΔSA3, the fifth-order axial spherical aberration will be −5.0 mλrms, thereby resulting in the increase of an absolute value.

As such, when the objective lens of the comparative example configured as such is used for the optical pickup device, spherical aberration of not a tolerable level is caused due to a variation of an oscillation wavelength, and the resulting spherical aberration is not correctable. As a result, the tolerance degree of the oscillation wavelength with respect to the design wavelength is limited in a semiconductor laser, thereby resulting in a problem of causing the reduction of the yield.

Described next are objective lenses in the examples of 1 to 5 and 7 for use in the optical pickup device and the optical disk device of the embodiments of the invention, which all solve the problems of such an objective lens of the comparative example, i.e., an objective lens of a previous type.

EXAMPLE 1

In the objective lens of Example 1, the reference characters are as described above, i.e., f, n, d, and NA, R, K, and $A_i$ indicating the shape of the first surface on the light-entering side, Cn indicating the nth-order coefficient of an optical path difference determining the length increase φ (h) for the optical path of the diffractive configuration provided to the first surface, and R, K, and $A_i$ indicating the shape of the second surface on the light-exiting side.

In such an objective lens of Example 1, as a result of some wavelength change, any change observed between SA3 being the third-order spherical aberration and SA5 being the fifth-order spherical aberration is derived as shown in FIG. 6. In such an objective lens of the first example, the third-order spherical aberration on the axis is −0.2 mλrms, and the fifth-order spherical aberration is 0.4 mλrms, which are both suppressed to be sufficiently small.

The change of third-order spherical aberration with respect to a temperature change ΔT (° C.), i.e., ΔSA3T/ΔT, is −0.5 mλrms/° C., and the change of third-order spherical aberration with respect to a wavelength change Δλ (nm), i.e., ΔSA3λ/Δλ, is 7.0 mλrms/nm. As such, (ΔSA3T/ΔT)·(ΔSA3λ/Δλ)<0 is thus established so that equation (27) above is satisfied.

Moreover, with C4×C10>0, equation (29) above is satisfied. Therefore, as shown in FIG. 6, when the oscillation wavelength is shifted by 1 nm to the side of a long wavelength from the design wavelength of 405 nm, ΔSA3 being the amount of change of third-order axial spherical aberration to be generated in the objective lens is 7.0 mλrms, and ΔSA5 being the amount of change of fifth-order axial spherical aberration is 0.5 mλrms. As such, with resulting ΔSA3×ΔSA5>0, equation (30) above is satisfied.

As described above, the resulting third-order axial spherical aberration generated as such can be cancelled out by directing converged lights to the objective lens through adjustment of the optical system, e.g., moving a collimator lens. With the objective lens of such design requirements, the third-order spherical aberration to be generated by a change of the scaling factor by 0.01 is −281 mλrms, and the fifth-order spherical aberration is −49 mλrms. If the scaling factor is so adjusted as to cancel out ΔSA3, the fifth-order axial spherical aberration will be −0.7 mλrms, thereby cancelling out the fifth-order spherical aberration at the same time.

As such, when the objective lens of Example 1 configured as such is used for the optical pickup device or others, the tolerance degree of an oscillation wavelength with respect to the design wavelength in a semiconductor laser can be extended, thereby being able to lead to the increase of the yield.

Further, with f×C2×λ=−75493>−85000, equation (31) above is satisfied. Accordingly, the deviation of the light-gathering position in the optical axis direction as a result of the shifting of the wavelength of 1 nm is suppressed to be small, i.e., 0.41 nm. Accordingly, a beam spot can be protected from blurring, which often occurs when the semiconductor laser shows some wavelength variation.

EXAMPLE 2

In the objective lens of Example 2, the reference characters are as described above, i.e., f, n, d, and NA, R, K, and $A_i$ indicating the shape of the first surface on the light-entering side, Cn indicating the nth-order coefficient of an optical path difference determining the length increase ϕ (h) for the optical path of the diffractive configuration provided to the first surface, and R, K, and $A_i$ indicating the shape of the second surface on the light-exiting side.

In such an objective lens of Example 2, as a result of some wavelength change, any change observed between SA3 being the third-order spherical aberration and SA5 being the fifth-order spherical aberration is derived as shown in FIG. 7. In such an objective lens of Example 2, the third-order spherical aberration on the axis is −0.4 mλrms, and the fifth-order spherical aberration is 0.1 mλrms, which are both suppressed to be sufficiently small.

The change of third-order spherical aberration with respect to a temperature change ΔT (° C.), i.e., ΔSA3T/ΔT, is −1.0 mλrms/° C., and the change of third-order spherical aberration with respect to a wavelength change Δλ (nm), i.e., ΔSA3%/Δλ, is 14.3 mλrms/nm. As such, (ΔSA3T/ΔT)·(ΔSA3λ/Δλ)<0 is thus established so that equation (27) above is satisfied.

Moreover, with C4×C10>0, equation (29) above is satisfied. Therefore, as shown in FIG. 7, when the oscillation wavelength is shifted by 1 nm to the side of a long wavelength from the design wavelength of 405 nm, ΔSA3 being the amount of change of third-order axial spherical aberration to be generated in the objective lens is 14.3 mλrms, and ΔSA5 being the amount of change of fifth-order axial spherical aberration is 1.3 mλrms. As such, with resulting ΔSA3×ΔSA5>0, equation (30) above is satisfied.

As described above, the resulting third-order axial spherical aberration generated as such can be cancelled out by directing converged lights to the objective lens through adjustment of the optical system, e.g., moving a collimator lens. With the objective lens of such design requirements, the third-order spherical aberration to be generated by a change of the scaling factor by 0.01 is −283 mλrms, and the fifth-order spherical aberration is −51 mλrms. If the scaling factor is so adjusted as to cancel out ΔSA3, the fifth-order axial spherical aberration will be −1.3 mλrms, thereby cancelling out the fifth-order spherical aberration at the same time.

As such, when the objective lens of Example 2 configured as such is used for the optical pickup device, the tolerance degree of an oscillation wavelength with respect to the design wavelength in a semiconductor laser can be extended, thereby being able to lead to the increase of the yield.

Further, with f×C2×λ=−70502>−85000, equation (31) above is satisfied. Accordingly, the deviation of the light-gathering position in the optical axis direction as a result of the shifting of the wavelength of 1 nm is suppressed to be small, i.e., 0.44 nm. Accordingly, a beam spot can be protected from blurring, which often occurs when the semiconductor laser shows some wavelength variation.

EXAMPLE 3

In the objective lens of Example 3, the reference characters are as described above, i.e., f, n, d, and NA, R, K, and $A_i$ indicating the shape of the first surface on the light-entering side, Cn indicating the nth-order coefficient of an optical path difference determining the length increase ϕ (h) for the optical path of the diffractive configuration provided to the first surface, and R, K, and $A_i$ indicating the shape of the second surface on the light-exiting side.

In such an objective lens of Example 3, as a result of some wavelength change, any change observed between SA3 being the third-order spherical aberration and SA5 being the fifth-order spherical aberration is derived as shown in FIG. 8. In such an objective lens of Example 3, the third-order spherical aberration on the axis is −0.6 mλrms, and the fifth-order spherical aberration is 0.2 mλrms, which are both suppressed to be sufficiently small.

The change of third-order spherical aberration with respect to a temperature change ΔT (° C.), i.e., ΔSA3T/ΔT, is −1.1 mλrms/° C., and the change of third-order spherical aberration with respect to a wavelength change Δλ (nm), i.e., ΔSA3λ/Δλ, is 16.8 mλrms/nm. As such, (ΔSA3T/ΔT)·(ΔSA3λ/Δλ)<0 is thus established so that equation (27) above is satisfied.

Moreover, with C4×C10>0, equation (29) above is satisfied. Therefore, as shown in FIG. 8, when the oscillation wavelength is shifted by 1 nm to the side of a long wavelength from the design wavelength of 405 nm, ΔSA3 being the amount of change of third-order axial spherical aberration to be generated in the objective lens is 16.8 mλrms, and ΔSA5 being the amount of change of fifth-order axial spherical aberration is 2.1 mλrms. As such, with resulting ΔSA3×ΔSA5>0, equation (30) above is satisfied.

As described above, the resulting third-order axial spherical aberration generated as such can be cancelled out by directing converged lights to the objective lens through adjustment of the optical system, e.g., moving a collimator lens. With the objective lens of such design requirements, the third-order spherical aberration to be generated by a change of the scaling factor by 0.01 is −282 mλrms, and the fifth-order spherical aberration is −49 mλrms. If the scaling factor is so adjusted as to cancel out ΔSA3, the fifth-order axial spherical aberration will be −0.8 mλrms, thereby cancelling out the fifth-order spherical aberration at the same time.

As such, when the objective lens of Example 3 configured as such is used for the optical pickup device, the tolerance degree of an oscillation wavelength with respect to the design wavelength in a semiconductor laser can be extended, thereby being able to lead to the increase of the yield.

Further, with f×C2×λ=−42298>−85000, equation (31) above is satisfied. Accordingly, the deviation of the light-gathering position in the optical axis direction as a result of the shifting of the wavelength of 1 nm is suppressed to be small, i.e., 0.24 nm. Accordingly, a beam spot can be protected from blurring, which often occurs when the semiconductor laser shows some wavelength variation.

EXAMPLE 4

In the objective lens of Example 4, the reference characters are as described above, i.e., f, n, d, and NA, R, K, and $A_i$ indicating the shape of the first surface on the light-entering side, Cn indicating the nth-order coefficient of an optical path difference determining the length increase $\phi$ (h) for the optical path of the diffractive configuration provided to the first surface, and R, K, and $A_i$ indicating the shape of the second surface on the light-exiting side.

In such an objective lens of Example 4, as a result of some wavelength change, any change observed between SA3 being the third-order spherical aberration and SA5 being the fifth-order spherical aberration is derived as shown in FIG. 9. In such an objective lens of Example 4, the third-order spherical aberration on the axis is −0.6 mλrms, and the fifth-order spherical aberration is 0.5 mλrms, which are both suppressed to be sufficiently small.

The change of third-order spherical aberration with respect to a temperature change $\Delta T$ (° C.), i.e., $\Delta SA3T/\Delta T$, is −1.2 mλrms/° C., and the change of third-order spherical aberration with respect to a wavelength change $\Delta\lambda$ (nm), i.e., $\Delta SA3\lambda/\Delta\lambda$, is 17.3 mλrms/nm. As such, $(\Delta SA3T/\Delta T)\cdot(\Delta SA3\lambda/\Delta\lambda)<0$ is thus established so that equation (27) above is satisfied.

Moreover, with C4×C10>0, equation (29) above is satisfied. Therefore, as shown in FIG. 9, when the oscillation wavelength is shifted by 1 nm to the side of a long wavelength from the design wavelength of 405 nm, $\Delta SA3$ being the amount of change of third-order axial spherical aberration to be generated in the objective lens is 17.3 mλrms, and $\Delta SA5$ being the amount of change of fifth-order axial spherical aberration is 2.4 mλrms. As such, with resulting $\Delta SA3\times\Delta SA5>0$, equation (30) above is satisfied.

As described above, the resulting third-order axial spherical aberration generated as such can be cancelled out by directing converged lights to the objective lens through adjustment of the optical system, e.g., moving a collimator lens. With the objective lens of such design requirements, the third-order spherical aberration to be generated by a change of the scaling factor by 0.01 is −279 mλrms, and the fifth-order spherical aberration is −47 mλrms. If the scaling factor is so adjusted as to cancel out $\Delta SA3$, the fifth-order axial spherical aberration will be −0.5 mλrms, thereby cancelling out the fifth-order spherical aberration at the same time.

As such, when the objective lens of Example 4 configured as such is used for the optical pickup device, the tolerance degree of an oscillation wavelength with respect to the design wavelength in a semiconductor laser can be extended, thereby being able to lead to the increase of the yield.

Further, with f×C2×λ=−28199>−85000, equation (31) above is satisfied. Accordingly, the deviation of the light-gathering position in the optical axis direction as a result of the shifting of the wavelength of 1 nm is suppressed to be small, i.e., 0.15 nm. Accordingly, a beam spot can be protected from blurring, which often occurs when the semiconductor laser shows some wavelength variation.

EXAMPLE 5

In the objective lens of Example 5, the reference characters are as described above, i.e., f, n, d, and NA, R, K, and $A_i$ indicating the shape of the first surface on the light-entering side, Cn indicating the nth-order coefficient of an optical path difference determining the length increase $\phi$ (h) for the optical path of the diffractive configuration provided to the first surface, and R, K, and $A_i$ indicating the shape of the second surface on the light-exiting side.

In such an objective lens of Example 5, as a result of some wavelength change, any change observed between SA3 being the third-order spherical aberration and SA5 being the fifth-order spherical aberration is derived as shown in FIG. 10. In such an objective lens of Example 5, the third-order spherical aberration on the axis is −0.6 mλrms, and the fifth-order spherical aberration is 0.3 mλrms, which are both suppressed to be sufficiently small.

The change of third-order spherical aberration with respect to a temperature change $\Delta T$ (° C.), i.e., $\Delta SA3T/\Delta T$, is −1.3 mλrms/° C., and the change of third-order spherical aberration with respect to a wavelength change $\Delta\lambda$ (nm), i.e., $\Delta SA3\lambda/\Delta\lambda$, is 18.4 mλrms/nm. As such, $(\Delta SA3T/\Delta T)\cdot(\Delta SA3\lambda/\Delta\lambda)<0$ is thus established so that equation (27) above is satisfied.

Moreover, with C4×C10>0, equation (29) above is satisfied. Therefore, as shown in FIG. 10, when the oscillation wavelength is shifted by 1 nm to the side of a long wavelength from the design wavelength of 405 nm, $\Delta SA3$ being the amount of change of third-order axial spherical aberration to be generated in the objective lens is 18.4 mλrms, and $\Delta SA5$ being the amount of change of fifth-order axial spherical aberration is 2.7 mλrms. As such, with resulting $\Delta SA3\times\Delta SA5>0$, equation (30) above is satisfied.

As described above, the resulting third-order axial spherical aberration generated as such can be cancelled out by directing converged lights to the objective lens through adjustment of the optical system, e.g., moving a collimator lens. With the objective lens of such design requirements, the third-order spherical aberration to be generated by a change of the scaling factor by 0.01 is −279 mλrms, and the fifth-order spherical aberration is −47 mλrms. If the scaling factor is so adjusted as to cancel out $\Delta SA3$, the fifth-order axial spherical aberration will be −0.4 mλrms, thereby cancelling out the fifth-order spherical aberration at the same time.

As such, when the objective lens of Example 5 configured as such is used for the optical pickup device, the tolerance degree of an oscillation wavelength with respect to the design wavelength in a semiconductor laser can be extended, thereby being able to lead to the increase of the yield.

Further, with f×C2×λ=−14100>−85000, equation (31) above is satisfied. Accordingly, the deviation of the light-gathering position in the optical axis direction as a result of the shifting of the wavelength of 1 nm is suppressed to be small, i.e., 0.06 nm. Accordingly, a beam spot can be protected from blurring, which often occurs when the semiconductor laser shows some wavelength variation.

EXAMPLE 7

In the objective lens of Example 7, the reference characters f, n, d, and NA are as below.
f: 1.41 [mm]
n: 1.525
d: 1.85 [mm]
NA: 0.85

The reference characters R, K, and $A_i$ representing the shape of the first surface on the light-entering side of the objective lens of Example 7 are as below. The nth-order coefficient Cn of an optical-path difference determining the increase $\phi$ (h) of the optical path by the zone diffractive structure provided to the first surface is as below.

Shape of First Surface
R: 0.909 [mm]
K: −0.643
$A_4$: 1.223×10⁻³
$A_6$: −5.870×10⁻³
$A_8$: 5.360×10⁻³
$A_{10}$: 8.749×10⁻³
$A_{12}$: −1.060×10⁻²
$A_{14}$: −1.335×10⁻³
$A_{16}$: −1.910×10⁻³
$A_{18}$: 9.417×10⁻³
$A_{20}$: −4.982×10⁻³
C2: 0.0
C4: −29.11
C6: −7.20
C8: −2.20
C10: −3.30

The reference characters R, K, and $A_i$ representing the shape of the second surface on the light-exiting side of the objective lens of Example 7 are as below.

Shape of Second Surface
R: −1.193 [mm]
K: −38.562
$A_4$: 3.767×10⁻¹
$A_6$: −6.287×10⁻¹
$A_8$: −3.154×10⁻¹
$A_{10}$: 2.892
$A_{12}$: −5.873
$A_{14}$: 5.936
$A_{16}$: −2.468

Figure 17:
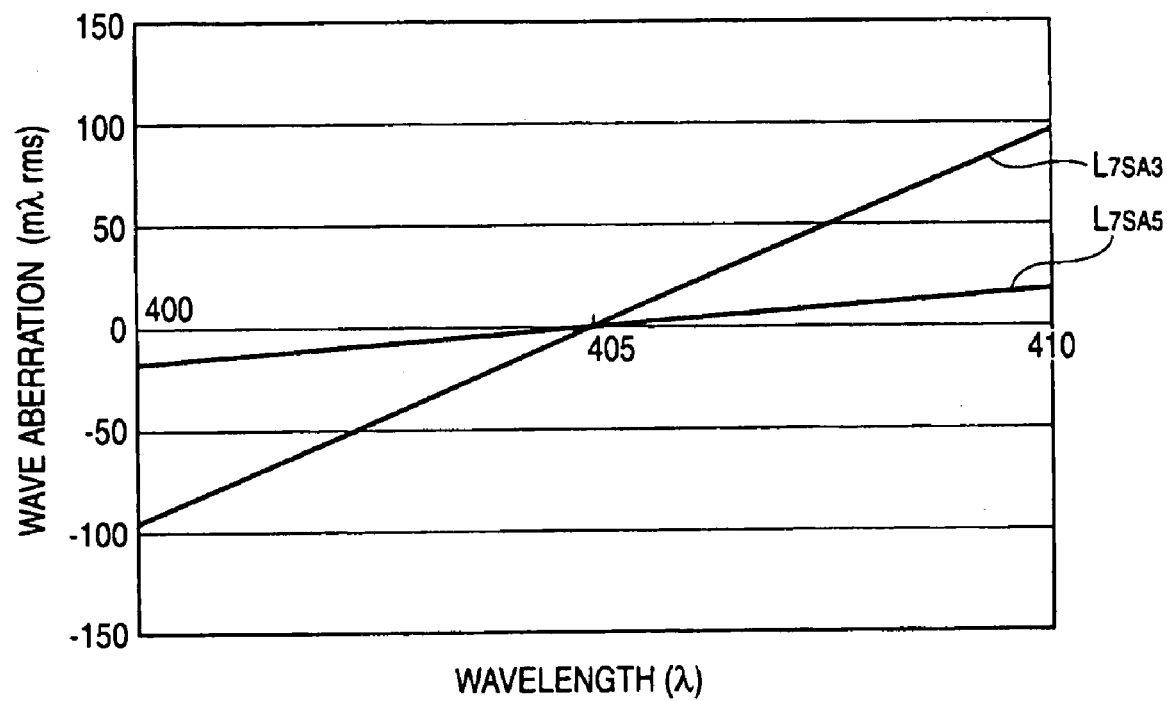
FIG. 17 is a diagram showing the characteristics of aberration caused by a wavelength variation of an objective lens of an example 7, i.e., a characteristic diagram showing a change caused by a wavelength variation between the third-order spherical aberration and the fifth-order spherical aberration.

In such design requirements, as a result of some wavelength change, any change observed between SA3 being the third-order spherical aberration and SA5 being the fifth-order spherical aberration is derived as shown in FIG. 17. Note that, FIG. 17 show a change of the third- and fifth-order spherical aberration as a result of any wavelength change in the design requirements in the respective examples. In FIG. 17, $L_{7SA3}$ denotes a change of the third-order spherical aberration SA3 as a result of any wavelength change, and $L_{7SA5}$ denotes a change of the fifth-order spherical aberration SA5 as a result of any wavelength change. Also in the drawings, the lateral axis denotes the wavelength (λ), and the vertical axis denotes the amount of aberration (mλrms).

In the design requirements above, the third-order spherical aberration on the axis is −0.4 mλrms, and the fifth-order spherical aberration is 0.0 mλrms, which are both suppressed to be sufficiently small.

The change of third-order spherical aberration with respect to a temperature change ΔT (° C.), i.e., ΔSA3T/ΔT, is −1.4 mλrms/° C., and the change of third-order spherical aberration with respect to a wavelength change Δλ (nm), i.e., ΔSA3λ/Δλ, is 19.2 mλrms/nm. As such, (ΔSA3T/ΔT)·(ΔSA3λ/Δλ)<0 is thus established so that equation (27) above is satisfied.

Moreover, with C4×C10>0, equation (29) above is satisfied. Therefore, as shown in FIG. 17, when the oscillation wavelength is shifted by 1 nm to the side of a long wavelength from the design wavelength of 405 nm, ΔSA3 being the amount of change of third-order axial spherical aberration to be generated in the objective lens is 19.2 mλrms, and ΔSA5 being the amount of change of fifth-order axial spherical aberration is 3.3 mλrms. As such, with resulting ΔSA3×ΔSA5>0, equation (30) above is satisfied.

As described above, the resulting third-order axial spherical aberration generated as such can be cancelled out by directing converged lights to the objective lens through adjustment of the optical system, e.g., moving a collimator lens. With the objective lens of such design requirements, the third-order spherical aberration to be generated by a change of the scaling factor by 0.01 is −276 mλrms, and the fifth-order spherical aberration is −45 mλrms. If the scaling factor is so adjusted as to cancel out ΔSA3, the fifth-order axial spherical aberration will be 0.2 mλrms, thereby cancelling out the fifth-order spherical aberration at the same time.

As such, when the objective lens of Example 7 configured as such is used for the optical pickup device, the tolerance degree of an oscillation wavelength with respect to the design wavelength in a semiconductor laser can be extended, thereby being able to lead to the increase of the yield.

Further, with f×C2×λ=0>−85000, equation (31) above is satisfied. Accordingly, the deviation of the light-gathering position in the optical axis direction as a result of the shifting of the wavelength of 1 nm is suppressed to be small, i.e., 0.06 nm. Accordingly, a beam spot can be protected from blurring, which often occurs when the semiconductor laser shows some wavelength variation.

As described above, with the objective lens of the comparative example and the optical pickup device provided therewith, spherical aberration of not a tolerable level is caused due to a variation of an oscillation wavelength in a light source, and if an attempt is made to correct the resulting third-order axial spherical aberration through adjustment of an optical system, the fifth-order axial spherical aberration is problematically increased, for example. On the other hand, with the objective lenses of Examples 1 to 5 and 7 and the optical pickup device provided therewith, an amount of change of third-order axial spherical aberration caused in the objective lenses due to some wavelength variation has a fixed relationship with an amount of change of fifth-order axial spherical aberration. Accordingly, even if the oscillation wavelength in a light source varies and shows a difference from the design wavelength, the resulting third- and fifth-order axial spherical aberration can be cancelled out at the same time through adjustment of an optical system, i.e., aberration as a result of some wavelength variation in a light source can be corrected and reduced. This thus enables to extend the tolerance range of the oscillation wavelength in the light source configuring the optical pickup device, increase the yield of the light source, and reduce the cost.

Moreover, the objective lenses of Examples 1 to 5 and 7 are each so formed as to satisfy equation (31) above. Accordingly, with the objective lenses of Examples 1 to 5 and 7 and the optical pickup device provided therewith, the distance L12 can be 0.5 μm or smaller between light-gathering positions before and after a wavelength change of 1 nm in light beams. As such, even if the light beams coming from the light source section 3 show some change in wavelength, a beam spot can be protected from blurring, i.e., any possible chromatic aberration can be sufficiently reduced.

As such, the optical pickup device 11 and the optical disk device provided therewith are those for information recording and/or reproduction with respect to a high-density-recording optical disk with an objective lens of a high numerical aperture and for a short wavelength. The optical pickup device 11 is so configured as to include the light source section 3, the objective lens 17, and the collimator lens 6. That is, the light source section 3 emits light beams of a predetermined design wavelength of about 405 nm. The objective lens 17 is a plastic lens provided with, on at least one surface, diffraction means of a zone diffractive structure suppressing generation of aberration caused by a temperature change, and has a numerical aperture of 0.82 or larger for gathering the light beams emitted from the light source section 3 with respect to the optical disk. The collimator lens 6 is disposed between the light source section 3 and the objective lens 17, and derives substantially-collimated lights by converting an angle of divergence of the light beam emitted from the light source section 3. The objective lens is formed to satisfy equation (27) above, where $\Delta SA3T$ is an amount of change of third-order spherical aberration to be generated in the objective lens 17 in response to a temperature change in the predetermined range described above, and $\Delta SA3\lambda$ is an amount of change of third-order spherical aberration generated in the objective lens 17 in response to a wavelength change within the predetermined range described above observed in the light beams emitted from the light source section 3. Equation (29) is satisfied when a length of an optical path increased by the diffractive structure of the diffraction means is represented by an optical-path difference function $\phi(h)$ calculated by equation (28). Equation (30) is satisfied, where $\Delta SA3$ is an amount of change of third-order axial spherical aberration caused in the objective lens with respect to the change of wavelength, and $\Delta SA5$ is an amount of change of fifth-order axial spherical aberration. With the objective lens configured as such, even if the oscillation wavelength in the light source section 3 varies due to the manufacturing deviations and shows a difference from the design wavelength, the resulting spherical aberration caused by such a difference of the oscillation wavelength from the design wavelength can be corrected and reduced through adjustment of an optical system, e.g., moving the collimator lens 6. That is, the tolerance range can be extended for the oscillation wavelength in the light source such as a semiconductor laser in the light source section while satisfactory recording and reproduction characteristics being retained, thereby realizing the increase of the yield of the semiconductor laser and the reduction of the cost for manufacturing the optical pickup device.

It should be understood by those skilled in the art that various modifications, combinations, sub-combinations and alterations may occur depending on design requirements and other factors insofar as they are within the scope of the appended claims or the equivalents thereof.

What is claimed is:

1. An optical pickup device comprising:
   a light source that emits a light beam of a predetermined wavelength of about 405 nm;
   an objective lens being a plastic lens provided with, on at least one surface, diffraction means of a zone diffractive structure suppressing generation of aberration to be caused by a temperature change, and has a numerical aperture of 0.82 or larger for gathering the light beam emitted from the light source with respect to an optical disk; and
   a collimator lens disposed between the light source and the objective lens, and derives a substantially-collimated light by converting an angle of divergence of the light beam emitted from the light source, wherein
   the objective lens is formed to satisfy equation (1), where $\Delta SA3T$ is an amount of change of third-order spherical aberration to be generated in the objective lens in response to a temperature change $\Delta T$ (° C.) in a range from $-10°$ C. to $75°$ C., and $\Delta SA3\lambda$ is an amount of change of third-order spherical aberration to be generated in the objective lens in response to a wavelength change $\Delta\lambda$ (nm) within a range of $\pm 5$ nm observed in the light beam emitted from the light source,
   equation (3) is satisfied when a length of an optical path increased by the diffractive structure of the diffraction means is represented by an optical-path difference function $\phi(h)$ calculated by equation (2), where h (mm) is a height from an optical axis, Cn is an nth-order coefficient of an optical-path difference, and $\lambda$ (nm) is a wavelength of an incoming light beam,
   equation (4) is satisfied, where $\Delta SA3$ is an amount of change of third-order axial spherical aberration to be generated in the objective lens in response to the wavelength change $\Delta\lambda$ (nm), and $\Delta SA5$ is an amount of change of fifth-order axial spherical aberration, and
   with the objective lens, the generation of the spherical aberration to be caused by the temperature change can be suppressed, and when the light beam emitted from the light source is changed in wavelength, the generation of the spherical aberration can be suppressed by moving the collimator lens $$(\Delta SA3T/\Delta T)\times(\Delta SA3\lambda/\Delta\lambda)<0 \qquad (1)$$

$$\phi(h)=(C2\times h^2+C4\times h^4+C6\times h^6+C8\times h^8+C10\times h^{10}+\ldots)\times\lambda/10^6 \text{ (mm)} \qquad (2)$$

$$C2\times C10>0 \qquad (3)$$

$$\Delta SA3\times\Delta SA5>0 \qquad (4).$$

2. The optical pickup device according to claim 1, wherein the objective lens is formed to have a distance of 0.5 μm or smaller in an optical axis direction between a position at which the light beam emitted from the light source is gathered thereby when the light beam has an arbitrary wavelength $\lambda$ (nm) in a range from 400 nm to 410 nm and a position at which the light beam emitted from the light source is gathered thereby when the light beam shows a wavelength change of 1 nm with respect to the arbitrary wavelength of $\lambda$ (nm).

3. The optical pickup device according to claim 1, wherein the objective lens is formed to satisfy equation (5) when a focal length thereof is f (mm) . . .

$$-1.1\times10^2<C2/f<1.3\times10^1 \qquad (5).$$

4. The optical pickup device according to claim 2 or 3, wherein
   the objective lens is formed to satisfy equation (6) when a focal length thereof is f (mm)

$$f\times C2\times\lambda>-85000 \qquad (6).$$

5. An optical disk device comprising
   an optical pickup device including:
   a light source that emits a light beam of a predetermined wavelength of about 405 nm;
   an objective lens being a plastic lens provided with, on at least one surface, diffraction means of a zone diffractive structure suppressing generation of aberration to be caused by a temperature change, and has a numerical aperture of 0.82 or larger for gathering the light beam emitted from the light source with respect to an optical disk; and
   a collimator lens disposed between the light source and the objective lens, and derives a substantially-collimated light by converting an angle of divergence of the light beam emitted from the light source, and
   performing recording and/or reproduction of an information signal with respect to the optical disk by the optical pickup device, wherein
   the objective lens is formed to satisfy equation (7), where $\Delta SA3T$ is an amount of change of third-order spherical aberration to be generated in the objective lens with respect to a temperature change $\Delta T$ (° C.) in a range from $-10°$ C. to $75°$ C., and $\Delta SA3\%$ is an amount of change of third-order spherical aberration to be generated in the objective lens in response to a wavelength change $\Delta\lambda$ (nm) within a range of ±5 nm observed in the light beam emitted from the light source, equation (9) is satisfied when a length of an optical path increased by the diffractive structure of the diffraction means is represented by an optical-path difference function $\phi$ (h) calculated by equation (8), where h (mm) is a height from an optical axis, Cn is an nth-order coefficient of an optical-path difference, and $\lambda$ (nm) is a wavelength of an incoming light beam, equation (10) is satisfied, where $\Delta SA3$ is an amount of change of third-order axial spherical aberration to be generated in the objective lens in response to the wavelength change $\Delta\lambda$ (nm), and $\Delta SA5$ is an amount of change of fifth-order axial spherical aberration, and with the objective lens, the generation of the spherical aberration to be caused by the temperature change can be suppressed, and when the light beam emitted from the light source is changed in wavelength, the generation of the spherical aberration can be suppressed by moving the collimator lens $$(\Delta SA3T/\Delta T) \times (\Delta SA3\lambda/\Delta\lambda) < 0 \qquad \text{Equation (7)}$$

$$\phi(h) = (C2 \times h^2 + C4 \times h^4 + C6 \times h^6 + C8 \times h^8 + C10 \times h^{10} + \ldots) \times \lambda/10^6 \text{(mm)} \qquad (8)$$

$$C2 \times C10 > 0 \qquad (9)$$

$$\Delta SA3 \times \Delta SA5 > 0 \qquad (10).$$

6. An optical pickup device comprising:

a light source that emits a light beam of a predetermined wavelength of about 405 nm;

an objective lens being a plastic lens provided with, on at least one surface, diffraction means of a zone diffractive structure suppressing generation of aberration to be caused by a temperature change, and has a numerical aperture of 0.82 or larger for gathering the light beam emitted from the light source with respect to an optical disk; and a collimator lens disposed between the light source and the objective lens, and derives a substantially-collimated light by converting an angle of divergence of the light beam emitted from the light source, wherein the objective lens is formed to satisfy equation (11) where $\Delta SA3T$ is an amount of change of third-order spherical aberration to be generated in the objective lens in response to a temperature change $\Delta T$ (° C.) in a range from −10° C. to 75° C., and $\Delta SA3\lambda$ is an amount of change of third-order spherical aberration to be generated in the objective lens in response to a wavelength change $\Delta\lambda$ (nm) within a range of ±5 nm observed in the light beam emitted from the light source, equation (13) is satisfied when a length of an optical path increased by the diffractive structure of the diffraction means is represented by an optical-path difference function $\phi$ (h) calculated by equation (12), where h (mm) is a height from an optical axis, Cn is an nth-order coefficient of an optical-path difference, and $\lambda$ (nm) is a wavelength of an incoming light beam, equation (14) is satisfied, where $\Delta SA3$ is an amount of change of third-order axial spherical aberration to be generated in the objective lens in response to the wavelength change $\Delta\lambda$ (nm), and $\Delta SA5$ is an amount of change of fifth-order axial spherical aberration, and with the objective lens, the generation of the spherical aberration to be caused by the temperature change can be suppressed, and when the light beam emitted from the light source is changed in wavelength, the generation of the spherical aberration can be suppressed by moving the collimator lens $$(\Delta SA3T/\Delta T) \times (\Delta SA3\lambda/\Delta\lambda) < 0 \qquad (11)$$

$$\phi(h) = (C2 \times h^2 + C4 \times h^4 + C6 \times h^6 + C8 \times h^8 + C10 \times h^{10} + \ldots) \times /10^6 \text{(mm)} \qquad (12)$$

$$C4 \times C10 > 0 \qquad (13)$$

$$\Delta SA3 \times \Delta SA5 > 0 \qquad (14).$$

7. The optical pickup device according to claim 6, wherein the objective lens is formed to have a distance of 0.5 μm or smaller in an optical axis direction between a position at which the light beam emitted from the light source is gathered thereby when the light beam has an arbitrary wavelength $\lambda$ (nm) in a range from 400 nm to 410 nm and a position at which the light beam emitted from the light source is gathered thereby when the light beam shows a wavelength change of 1 nm with respect to the arbitrary wavelength of $\lambda$ (nm).

8. The optical pickup device according to claim 7, wherein the objective lens is formed to satisfy equation (15) when a focal length thereof is f (mm)

$$f \times C2 \times \lambda > -85000 \qquad (15).$$

9. An optical disk device comprising an optical pickup device including:

a light source that emits a light beam of a predetermined wavelength of about 405 nm;

an objective lens being a plastic lens provided with, on at least one surface, diffraction means of a zone diffractive structure suppressing generation of aberration to be caused by a temperature change, and has a numerical aperture of 0.82 or larger for gathering the light beam emitted from the light source with respect to an optical disk; and a collimator lens disposed between the light source and the objective lens, and derives a substantially-collimated light by converting an angle of divergence of the light beam emitted from the light source, and performing recording and/or reproduction of an information signal with respect to the optical disk by the optical pickup device, wherein the objective lens is formed to satisfy equation (16) where $\Delta SA3T$ is an amount of change of third-order spherical aberration to be generated in the objective lens in response to a temperature change $\Delta T$ (° C.) in a range from −10° C. to 75° C., and $\Delta SA3\lambda$ is an amount of change of third-order spherical aberration to be generated in the objective lens in response to a wavelength change $\Delta\lambda$ (nm) within a range of ±5 nm observed in the light beam emitted from the light source, equation (18) is satisfied when a length of an optical path increased by the diffractive structure of the diffraction means is represented by an optical-path difference function $\phi$ (h) calculated by equation (17), where h (mm) is a height from an optical axis, Cn is an nth-order coefficient of an optical-path difference, and $\lambda$ (nm) is a wavelength of an incoming light beam, equation (19) is satisfied, where ΔSA3 is an amount of change of third-order axial spherical aberration to be generated in the objective lens in response to the wavelength change Δλ(nm), and ΔSA5 is an amount of change of fifth-order axial spherical aberration, and with the objective lens, the generation of the spherical aberration to be caused by the temperature change can be suppressed, and when the light beam emitted from the light source is changed in wavelength, the generation of the spherical aberration can be suppressed by moving the collimator lens $$(\Delta SA3T/\Delta T) \times (\Delta SA3\lambda/\Delta\lambda) < 0 \tag{16}$$

$$\phi(h) = (C2 \times h^2 + C4 \times h^4 + C6 \times h^6 + C8 \times h^8 + C10 \times h^{10} + \ldots) \times \lambda/10^6 \text{(mm)} \tag{17}$$

$$C4 \times C10 > 0 \tag{18}$$

$$\Delta SA3 \times \Delta SA5 > 0 \tag{19}$$

* * * * *